United States Patent [19]

Aly et al.

[11] Patent Number: 4,995,031
[45] Date of Patent: Feb. 19, 1991

[54] EQUALIZER FOR ISDN-U INTERFACE

[75] Inventors: Sami A. H. Aly, Kanata; Babak Sayar, Ottawa, both of Canada

[73] Assignee: Northern Telecom Limited, Montreal, Canada

[21] Appl. No.: 368,239

[22] Filed: Jun. 19, 1989

[51] Int. Cl.$^5$ .............................................. H04J 3/00
[52] U.S. Cl. ..................................... 370/32.1; 375/12; 375/14
[58] Field of Search ............................ 375/11, 12, 14; 370/32.1

[56] References Cited

U.S. PATENT DOCUMENTS

| | | | |
|---|---|---|---|
| 4,061,978 | 12/1977 | Motley et al. | 375/14 |
| 4,800,573 | 1/1989 | Cupo | 375/14 |
| 4,815,103 | 3/1989 | Cupo et al. | 375/14 |

OTHER PUBLICATIONS

IEEE Transactions on Communications, "A Maximum-Likelihood Sequence Estimator with Decision-Feedback Equalization", by Won U. Lee and F. S. Hill, Jr., vol. COM-25, No. 9, Sep. 1977, pp. 971–979.
A Transmission System for ISDN Loops, by Ephraim Arnon et al, IEEE, 1986, pp. 192–200.
Digital Subscriber Loop Transmission Using Echo Canceller and Balancing Networks, by Misao Fukuda et al, IEEE, 1985, pp. 1181–1185.
IEEE Transactions on Communications, "Line Equalizer for a Digital Subscriber Loop Employing Switched Capacitor Technology", by Toshiro Suzuki et al, vol. COM-30, No. 9, Sep. 1982, pp. 2074–2082.
An ISDN 2B+D Basic Access Transmission System, by Roy B. Blake et al, AT&T Bell Laboratories, Whippany, N.J.
"A New Transmission System for ISDN Access at 144 kB/s", by Michael Vry, ISSLS 1984.
British Telecom Technology Journal, "A Long Reach Digital Subscriber Loop Transceiver", by P. F. Adams et al, vol. 5, No. 1, Jan. 1987, pp. 25–31.

*Primary Examiner*—Jin F. Ng
*Assistant Examiner*—Jhancy Augustus

*Attorney, Agent, or Firm*—Foley & Lardner, Schwartz, Jeffery, Schwaab, Mack, Blumenthal & Evans

[57] ABSTRACT

A receiver for a digital data transmission system comprises a sampling device for sampling digital data signals received from a subscriber loop. A precursor equalizer connected to the output of the sampling device equalizes, in effect filters, the sampled digital data signal. A timing recovery circuit connected to the output of the precursor equalizer controls the sampling device in dependence upon the filtered digital data signal. The precursor equalizer has a difference equation such that the equalized digital data signal has at least one zero-crossing occurring substantially one baud before the main cursor of each pulse. For twisted wire pair subscriber loops, the precursor equalizer may have a different equation:

$$w(n) = \frac{-h_{-1}}{h_o} y(n) + y(n-1)$$

which produces a single precursor zero-crossing. Alternatively, the precursor equalizer may have a difference equation:

$$w(n) = \left(\frac{h_{-1}}{h_o}\right)^2 \cdot y(n) - \frac{h_{-1}}{h_o} \cdot y(n-1) + y(n-2)$$

which produces two precursor zero crossings, y(n) being the input to the filter, w(n) its output, $h_0$ the main cursor height before equalization and $h_{-1}$ the precursor height before equalization. The latter precursor equalizer may be modified by multiplying each of the coefficients $(h_{-1}/h_0)^2$ and $h_{-1}/h_0$ by a factor $$\frac{1}{1 - \frac{h_1 h_{-1}}{h_o^2}}$$

for more precise determination of the zero crossings. A $(1-Z^{-1})$ filter may be provided ahead of the precursor equalizer.

12 Claims, 17 Drawing Sheets

$$z_n = (-1)^m (a_{n-1} x_n - a_n x_{n-1})$$

EQUALIZER FOR ISDN-U INTERFACE

FIELD OF THE INVENTION

This invention relates to digital data transmission systems and is applicable especially to an apparatus and method for equalization in digital subscriber loop interface circuits.

Embodiments of the invention find application in digital data receivers in the U-interface of Integrated Services Digital Networks (ISDN).

BACKGROUND

The digital subscriber loop interface circuit usually will comprise two parts; a transmitter and a receiver. The function of the transmitter is to put a series of pulses, usually shaped by some form of filter, on the loop. In the U-interface of an ISDN (Integrated Services Digital Network) system, these pulses are likely to be 4-level pulses, particularly encoded as the so-called 2B1Q code (two binary, one quaternary) recommended by the American National Standard Institute (Working Group T1E1).

The function of the receiver is to detect pulses being sent from the far end of the loop, which is difficult because these pulses are distorted such that relatively square pulses being transmitted from the far end are smeared by the time they arrive at the receiver. One source of distortion is coupling of the transmit pulses, being put onto the loop, directly across the hybrid circuit and into the receiver input as "echoes", which is a common problem when operating on a two-wire system.

Such transmit pulse echoes are removed by echo-cancellation, typically using a transversal filter to derive a function or model of the transmit signal for subtraction from the received signal. For an example of such an echo-canceller, the reader is directed to copending application Ser. No. 261,133, filed on Oct. 24, 1988 by Sami Aly et al, entitled "Apparatus and Method for Echo Cancellation", which is incorporated herein by reference.

Once the echo-canceller circuit has removed the image of the transmitter pulses from the received pulses, what remain are the pulses being transmitted from the far end of the loop. These pulses, of course, may still be distorted by intersymbol interference or ISI, which includes interference from symbols received before the symbol of interest as a result of variation of the loss and delay characteristics of the loop with frequency. As a result of the delaying characteristics of the loop, when symbols are transmitted, the tail of one symbol persists into the time slot of the next symbol, making it difficult to determine the correct amplitude of the pulse designated to that time slot. The pulses may also be distorted by added noise due to cross talk from signals transmitting along adjacent pairs. This might be near end cross talk or impulse noise. Another source of distortion is added low frequency noise due to electrical power lines.

Of particular relevance to the present invention, however, is post cursor distortion which results from the band-limited frequency response of the channel. In the time domain, this results in a received pulse response with a long tail. In addition this band-limited frequency response may produce precursor distortion which, in the time domain, shows as a received pulse response with a slow rise time that is not zero at any multiple of baud periods ahead of the sampling time instant. The problem is worse for full duplex transmission where, as mentioned previously, the local transmitted signal echo provides a significant distortion component usually necessitating echo cancellation.

These forms of distortion are interrelated so that a solution for one form can make the others worse. Moreover, the manner in which the distortion is treated can affect other functions in the receiver, especially timing recovery, which involves synchronizing the sampling clock to the received far end signal. For details of a timing recovery circuit suitable for ISDN, the reader is directed to copending application Ser. No. 07/261,134, now U.S. Pat. No. 4,896,334, entitled "Method and Apparatus for Timing Recovery" by Babak Sayar et al, which is incorporated herein by reference.

A digital data receiver usually will have an equalizer to correct the pulse distortion caused by the transmission channel. Post-cursor ISI is usually dealt with by means of a decision feedback equalizer (DFE). Although forward equalization also can eliminate, or at least reduce, the length of the tail, decision feedback equalization produces less noise enhancement and can be easier to implement. A disadvantage of decision feedback equalization is that errors are propagated, whereas forward equalization is less prone to error propagation and can take care of both pre- and post-cursor distortion.

If only a decision feedback equalizer is used, received pulses may be sampled at a point that will cause precursor ISI that cannot be cancelled by the decision feedback equalizer. In such a situation, the distortion might be cancelled using, say, sequence estimation methods such as proposed by W. Lee and F. Hill Jnr. in a paper entitled "A Maximum Likelihood Sequence Estimator with Decision Feedback Equalization", IEEE Transactions on Communications, Sept. 1977. In addition, a relatively more complicated timing estimate needs to be derived to sample the received pulses at the optimum sampling phase.

In order to address these problems it has been proposed to use a combination of a feedforward equalizer and a feedback equalizer. In this case a compromise has to be accepted between, on the one hand, the noise enhancement performance and, on the other hand, the complexity and convergence speed of the decision feedback equalizer.

Known equalizers use a low pass filter to limit high frequency noise. What follows the low pass filter will often differ according to whether the equalizer is generally analog or to be fabricated using DSP (digital signal processing) technology. An "analog" equalizer may use a simple DFE (decision feedback equalizer) in combination with an adaptive forward cable equalizer. The adaptive forward cable equalizer may be an ALBO (automatic line build out) equalizer, as proposed by Ephraim Arnon et al in a paper entitled "A Transmission System for ISDN Loops", IEEE 1986, or a $\sqrt{f}$ equalizer as disclosed by Misao Fukuda et al in a paper entitled "Digital Subscriber Loop Transmission Using Echo Canceller and Balancing Networks" IEEE August 1985; by Toshiro Suzuki et al in a paper entitled "Line Equalizer for a Digital Subscriber Loop Employing Switched Capacitor Technology", IEEE Trans. on Communications, Sept. 1982, or by Roy B. Blake, Noah L. Gottfried, B. J. Trivedi and William F. Zucker in a paper entitled "An ISDN 2B+D Basic Access Transmission System", AT&T Bell Laboratories, Whippany, New Jersey 07981, U.S.A.

Although the combination of a low pass filter and simple decision feedback equalizer lends itself to analog implementation, it has the disadvantage of enhancing high frequency noise and being too complex to implement digitally. With the increasing use of digital signal processing in data communications, it is desirable to implement the equalizer using a digital signal processor (DSP). When using a DSP, it may be preferable to use a fixed, simple forward equalizer but with a more complex DFE, typically with more taps than the relatively simple DFE used for the analog equalizer. The fixed forward equalizer may be a single-pole, single-zero equalizer such as disclosed by Michael Vry in a paper entitled "A New Transmission System for ISDN Access at 144 kB/s" ISSLS 1984, or a $(1-Z^{-1})$ equalizer such as disclosed by P. F. Adams et al in a paper entitled "A Long Reach Digital Subscriber Loop Transceiver", British Telecom Technology Journal Volume 5 No. 1 Jan. 1987.

Although these techniques are more suitable for DSP implementation, they do not provide the degree of pulse shaping required substantially to minimize the precursor pulse distortion and the near end cross talk noise.

SUMMARY OF THE INVENTION

According to the present invention, a receiver for a digital data transmission system comprises sampling means having an input for receiving digital data signals from a subscriber loop, said sampling means being operable to sample a received digital signal, precursor equalizer means for equalizing the sampled digital data signal from the output of said sampling means, and timing recovery means for controlling said sampling means in dependence upon the output of said precursor equalizer means, said precursor equalizer means having a difference equation such that the equalized digital data signal has at least one zero-crossing occurring substantially one baud before the main cursor of each pulse.

In one embodiment, suitable for twisted wire pair subscriber loops, the precursor equalizer is a first order filter having a difference equation:

$$w(n) = \frac{-h_{-1}}{h_o} y(n) + y(n-1)$$

which produces a single precursor zero-crossing, y(n) being the input to the precursor equalizer, w(n) its output, $h_0$ the main cursor height before equalization and $h_{-1}$ the precursor height before equalization.

In another embodiment, the precursor equalizer is a second order filter having a difference equation:

$$w(n) = \left(\frac{h_{-1}}{h_o}\right)^2 \cdot y(n) - \frac{h_{-1}}{h_o} \cdot y(n-1) + y(n-2)$$

which produces two precursor zero crossings, y(n) being the input to the precursor equalizer, w(n) its output, $h_0$ the main cursor height before equalization and $h_{-1}$ the precursor height before equalization.

In yet another embodiment, the precursor equalizer has a difference equation:

$$w(n) = \beta \cdot y(n) + \alpha \cdot y(n-1) + y(n-2)$$

-continued
where:

$$\alpha = -\frac{h_{-1}}{h_0} \cdot \delta$$

$$\beta = \frac{h_{-1}^2}{h_0} \cdot \delta$$

$$\delta = \frac{1}{1 - \frac{h_1 h_{-1}}{h_0^2}}$$

y(n) is the input to the precursor eqalizer, w(n) is its output, $h_o$ is the main cursor height before equalization, $h_{-1}$ is the precursor height before equalization, and $h_1$ is the first postcursor height before equalization.

Embodiments of the invention may further comprise a $(1-Z^{-1})$ filter ahead of the aforesaid precursor equalizer. A decision feedback equalizer also may be provided.

BRIEF DESCRIPTION OF THE DRAWINGS

An embodiment of the invention will now be described by way of example only and with reference to the accompanying drawings, in which:

Referring to FIG. 1, which illustrates a U-interface transceiver comprising a transmitter and receiver, the components encircled by broken lines, namely the echo canceller, decision feedback equalizer, adaptive reference circuit (ARC), and timing recovery circuit are embodied in a digital signal processor. Digital data for transmission at 160 kb/s is applied to a scrambler 100 which encodes the data into a pseudo-random bit stream which is formatted by framer 102 into frames of 240 bits or 120 bauds, in accordance with specification T1D1. The framer 102 also includes a 9-baud signalling word in each frame of data.

Figure 1:
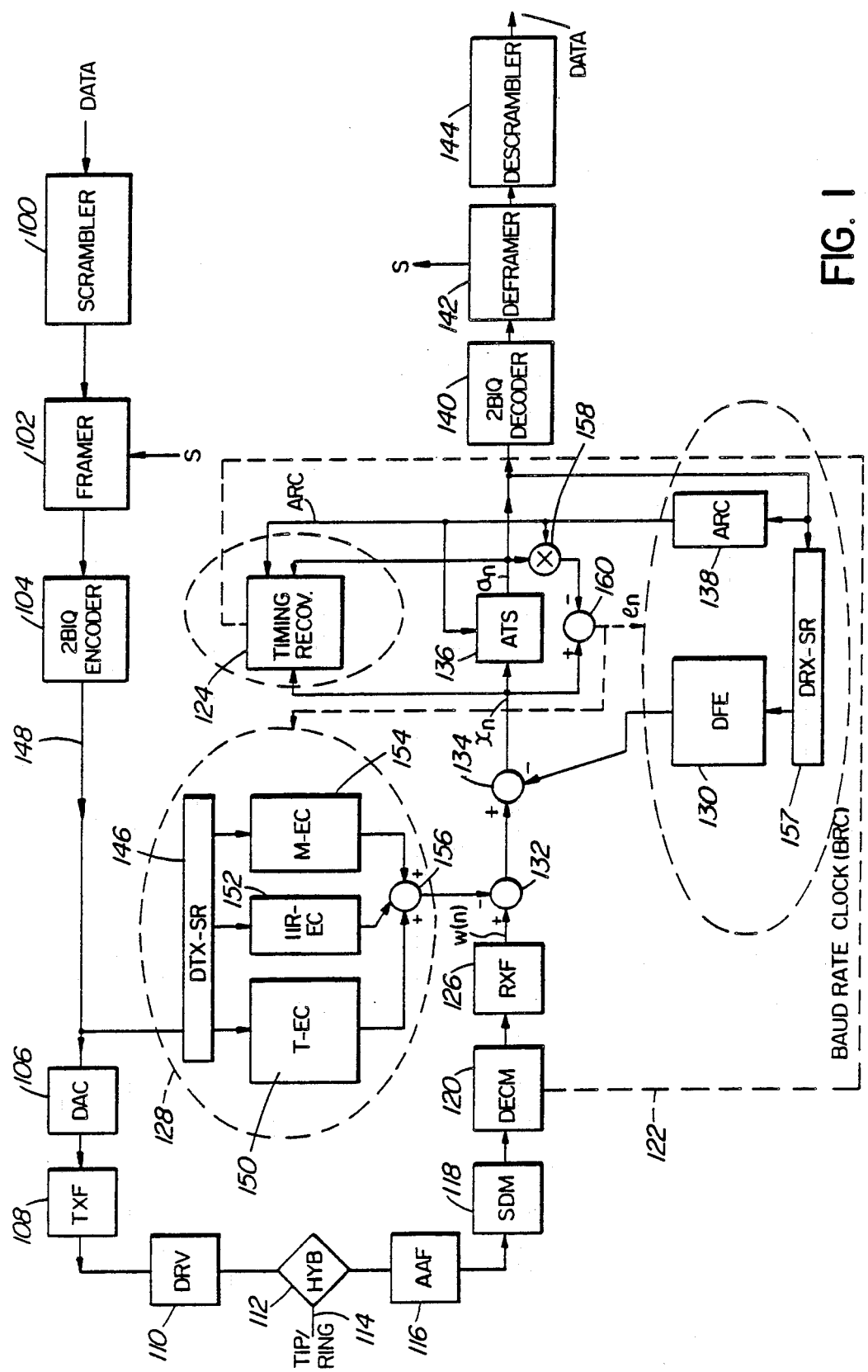
FIG. 1 is a block schematic diagram of a transceiver for a U-interface in an ISDN system.

The framed and scrambled signal is applied to 2B1Q encoder 104 where it is converted to a parallel format by a serial-to-parallel converter, which produces dibits in the combinations 00, 01, 10, 11. Dibit-to-symbol mapping produces the four corresponding levels −3, −1, +3 and +1. Digital-to-analogue converter 106 converts the levels +1, +3, −1, −3 to corresponding voltage levels for application to transmit filter 108. The digital-to-analogue converter 106 needs to be at least 3 bits capacity. Digital-to-analogue converter 106 converts the binary two's complement representation of the signal on line 148 into a voltage level for application to channel interface 110 for transmission via the hybrid 112 onto the tip and ring of the subscriber loop 114. The channel interface 110 comprises a power driver to drive the transmit port of the hybrid 112. The transmit filter 108 takes the high frequencies out of the pulses to reduce crosstalk and EMI (electromagnetic interference) effects during transmission.

Incoming signals from the subscriber loop 114 leave the receive port of the hybrid 112 and are processed by a corresponding 2B1Q receiver employing baud rate sampling and timing recovery. The receiver comprises a channel interface 116 which includes an anti-aliasing filter to remove high frequencies. The filtered signal from the channel interface 116 is applied to a sigma-delta modulator 118 which oversamples the received signal effectively performing analogue-to-digital conversion of the signal. The output of the sigma-delta modulator 118 is supplied to a decimator 120 which, with the anti-aliasing filter 116, performs the same functions generally as a low pass filter, sampler, and analogue-to-digital converter.

The sigma-delta modulator 118 employs an oversampled converter which runs at about 10 Mhz and hence oversamples the signal by a very large ratio. The sampling phase of decimator 120 is adjustable by means of the recovered Baud Rate Clock applied to it as indicated by (broken) line 122 from a timing recovery circuit 124. Since the decimator 120 runs at 10 MHz, the sampling instant can be moved in 1/10 MHz steps in response to the Recovered Baud Rate Clock, by simply taking a different sample out i.e. by just stepping the clock signal backwards or forwards by one unit of the period of the 10 MHz clock as in a digital phase-locked loop.

Figure 6:
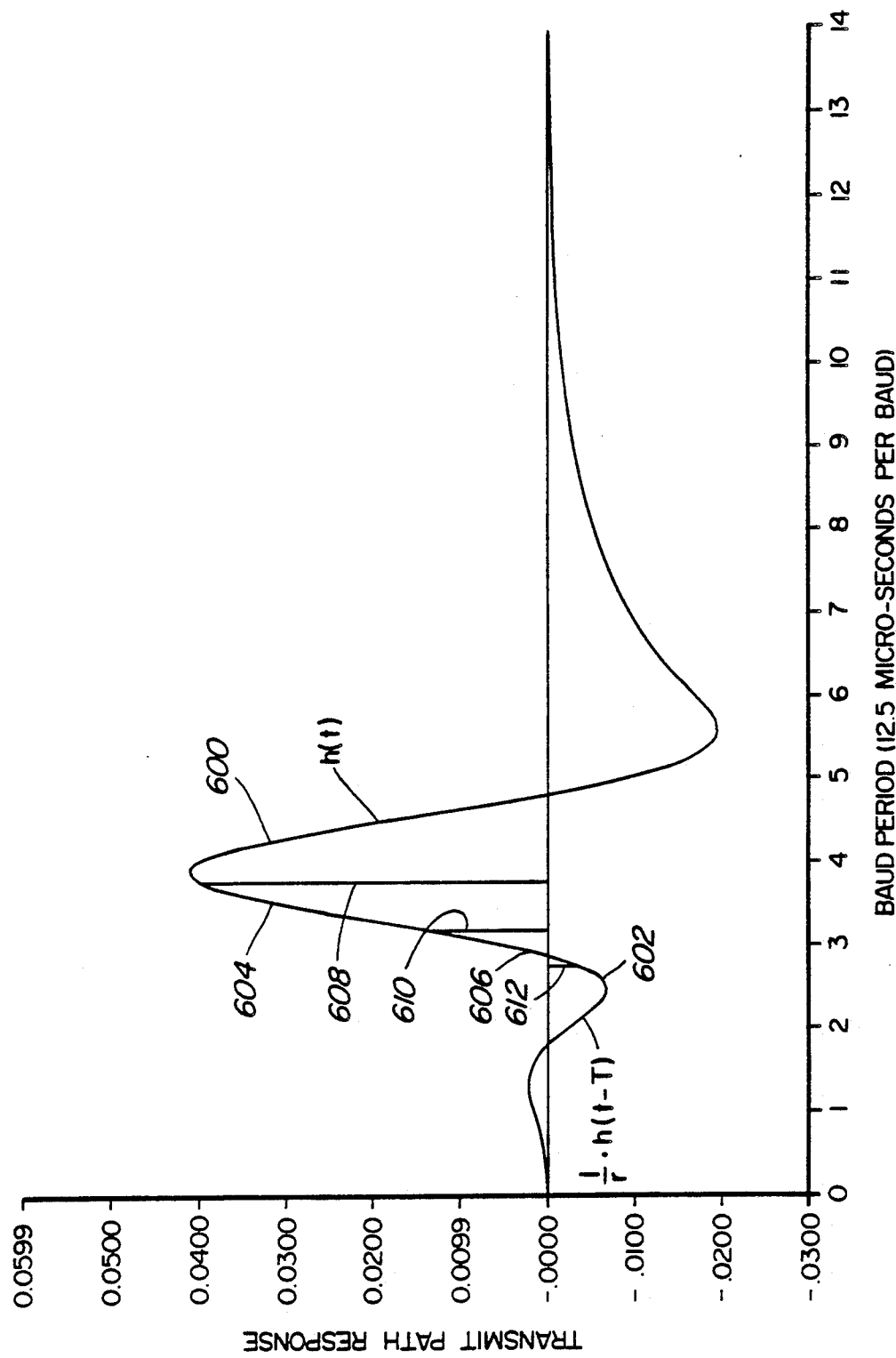
FIG. 6 shows a typical impulse response for the subscriber loop with an equalizer according to the invention.

The digitized samples of the received analogue signal, from the output of decimator 120, are filtered by high pass receiver filter 126, which serves as a precursor or feed-forward equalizer and enhances high frequencies. A typical impulse response at the output of receiver filter 126 is shown in FIG. 6, for a second order filter. The main pulse is identified by the reference numeral 600 and the precursor undershoot by the reference numeral 602. Enhancing the high frequencies will increase the steepness of the pulse front, identified as 604. The amplitude of precursor undershoot 602 will be increased and the zero crossing 606 between the precursor and the main pulse will be delayed to occur closer to the peak of the main pulse 600. Consequently, the sampling position, referenced 608, nominally set at one baud after the zero crossing, will also recede closer to the peak of the pulse. The "main cursor" is the pulse height at the sampling position 608 and the "precursor" is the first precursor pulse height one baud earlier. When the main cursor 608 is substantially coincident with the peak of the main pulse 600, the precursor should preferably coincide with the zero crossing. In FIG. 6, it is shown at sampling position 610, some distance away, illustrating where it would be if sampling were late. If sampling were early, the precursor would correspond to the pulse height at sampling position 612.

Since the steepness of the wave adjacent the zero crossing will be increased, the sampling phase error detection will be enhanced. This is because the sampling points such as those referenced 610 and 612, respectively, each side of the zero crossing 606, are more easily discerned, which will reduce jitter.

It should be appreciated that the precursor undershoot is not usually present as the signal leaves the subscriber loop 114 but rather is introduced by the receiver filter 126. The precursor 602 is necessary, or at least desirable, to improve the detection of the zero crossing point. When the precursor is absent, the resulting flat portion does not readily facilitate the detection of amplitude variations in the vicinity of the zero crossing. It should be noted that the extent to which the pulse can be steepened to enhance the zero crossing is limited because additional precursors will be generated and hence a greater amount of precursor intersymbol interference and consequent jitter will be produced. Thus, the two effects must be accommodated in practice.

Referring again to FIG. 1, correction signals from an echo canceller 128 and a decision feedback equalizer 130, respectively, are subtracted from the filtered sample by subtractors 132 and 134, respectively, resulting in an equalized and echo cancelled version $x_n$ of the far-end signal at the input of adaptive threshold slicer 136. The adaptive threshold slicer 136 allocates the individual samples of the received signal to one of the four levels specified for the 2B1Q signal to constitute the recovered far-end symbol $a_n$.

The thresholds are adapted in response to an adaptive reference signal ARC provided by an ARC (adaptive reference control) circuit 138. This circuit estimates the main cursor, i.e. the pulse height at the sampling position, and is adapted in the same manner as a decision feedback equalizer tap. It serves basically to provide normalization in various parts of the receiver for loop loss, a function analogous to that of an automatic gain control circuit.

A multiplier 158 multiplies the recovered far-end signal $a_n$ by the adaptive reference signal ARC. The result is subtracted, by means of subtractor 160, from the equalized far-end signal $x_n$ to give an adaptation error signal $e_n$ which is applied not only to the adaptive reference circuit 138, but also to the echo canceller 128 and the decision feedback equalizer 130.

The recovered far-end signal $a_n$ from the output of adaptive threshold slicer 136 is applied to a 2B1Q decoder 140 which operates in the inverse way to the 2B1Q encoder 104. The decoded signal is segregated into its components by a deframer 142 which breaks down the framing. Finally the data is descrambled by descrambler 144.

As mentioned earlier, problems arise because the pulses being transmitted onto the loop 114 result in echo on the receiver side of the hybrid due to transhybrid coupling and it is difficult to segregate the echoes of these transmitted pulses from the pulses being received from the loop 114.

Echo canceller 128 generates a replica of the transmitted pulse wave form and subtracts it from the received pulses. This echo canceller 128 comprises a shift register 146 which has its input connected to line 148 (the output of encoder 104) and has three outputs, one connected to echo canceller 150, a second connected to an IIR-EC (infinite impulse response) filter 152 and the third connected to a memory echo canceller 154. The outputs of the three echo cancellers 150, 152 and 154, respectively, are summed by summing means 156 and subtrated from the filtered sample by subtractor 132.

Intersymbol interference is corrected by means of the decision feedback equalizer 130 which is supplied by a shift register 157 having an input connected to the output of adaptive threshold slicer 136. The output of transversal filter digital feedback equalizer 130 is applied to the negative input of subtractor means 134 for subtraction from the recovered signal.

When the various corrections have been made to the signal, the timing instant is determined by timing recovery means 124 which has one input connected to the input of adaptive threshold slicer 136 to receive equalized far-end signal $X_n$, and a second input connected to the output of adaptive threshold slicer 136 to receive recovered far-end signal $a_n$. The timing recovery means 124 also receives the adaptation reference signal $E_n$ from the ARC circuit 138 and produces the Baud Rate Clock which, as previously mentioned, is applied to decimator 120 (via the broken line 122) and controls the sampling instant at which decimator 120 samples the received signal.

Figure 2:
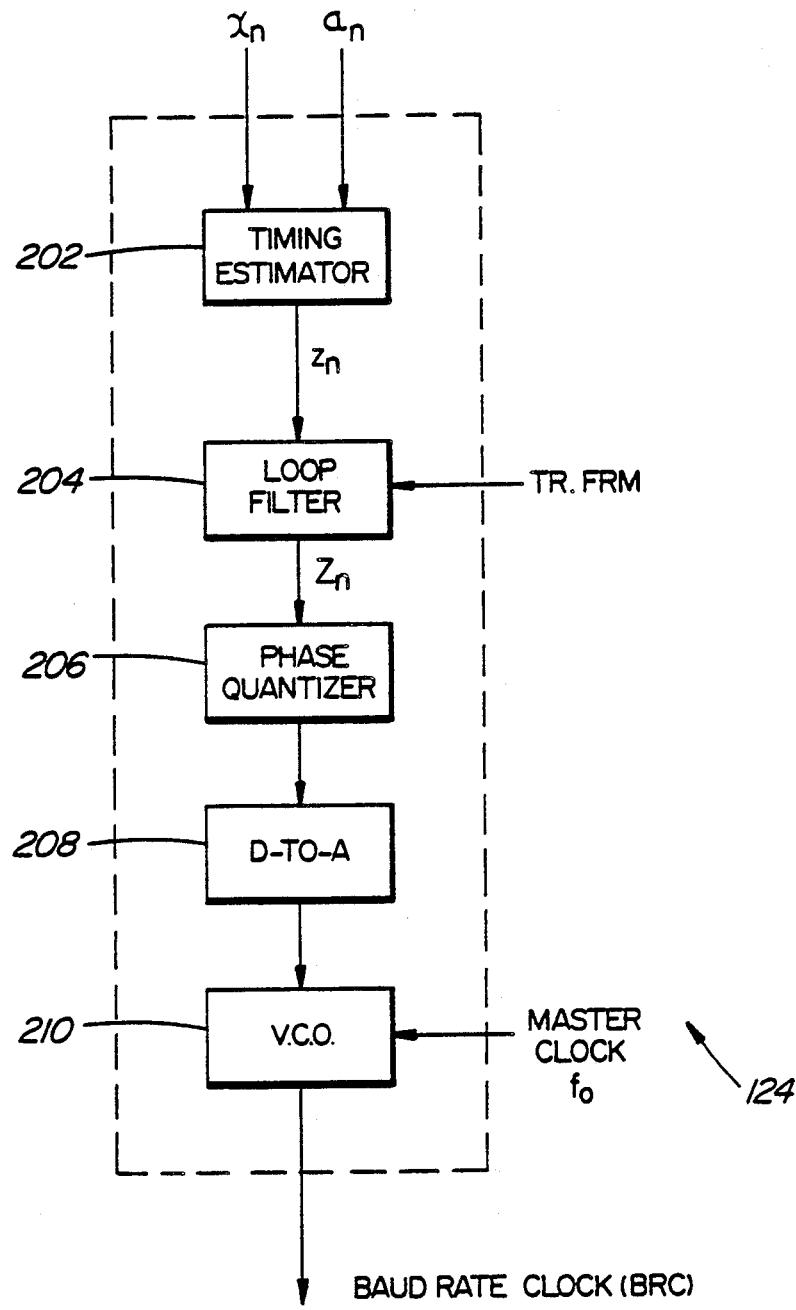
FIG. 2 is a block schematic diagram of a timing recovery circuit of the receiver portion of the transceiver of FIG. 1.

FIG. 2 shows the main stages of the timing recovery circuit 124 in block diagram form. The two signals $x_n$ and $a_n$, respectively, are supplied to a timing estimator 202 (to be described in detail later) which generates the timing estimate $z_n$ in accordance with the expression:

$$Z_n = (-1)^m \cdot (a_{n-1} x_n - a_n x_{n-1})$$

where m represents the magnitude bit of the 2B1Q symbol (m=0 for magnitude 1, m=1 for magnitude 3).

The timing estimator 202 generates an estimate every time a new sample is obtained. In simple terms, the output of the timing estimator 202, the timing estimate $z_n$, is a measure of the sampling phase error—the deviation from the correct sampling phase—and is used initially to acquire correct timing and thereafter to track the changes in the phase and /or frequency of the received signal. The output signal $z_n$ of the timing estimator 202 is supplied to a loop filter 204 which is controlled by the frame pulse TR.FRM and generates a filtered version $Z_n$ of the timing estimate. The design of the loop filter 204 can be of varying complexity to meet the desired phase-locked loop (PLL) performance objectives. In some cases it may be omitted altogether and the estimate $z_n$ used directly to control the phase once every baud. Thus the output $z_n$ of the timing estimator 202 would be fed directly to the phase quantizer 206. The loop filter will usually be used in ISDN-U applications due to requirements of network terminators with regard to echo degradation caused by phase jump hidden behind the sync word and of line terminators with regard to permanent changes in the echo path requiring the echo canceller to converage again. Generally the loop filter will give lower jitter.

In this specific example of a simple first order PLL configuration, the loop filter 204 performs averaging (integrate and dump) of the timing estimate $z_n$ over a frame of baud rate samples. The sampling phase is adjusted once every frame in dependence upon the new value of loop filter output $Z_n$. In the ISDN-U interface, this frame is 120 bauds long and corresponds to the T1D1 frame interval. The phase jumps are timed to occur at the start of the frame synchronization word.

The filtered timing estimate $Z_n$ is supplied to a phase quantizer 206. The basic function of the phase quantizer 206 is to interpret the output of the loop filter 204 and make a decision as to whether to "advance", "retard", or "hold" the recovered Baud Rate clock. In the preferred embodiment, the phase quantizer 206 corresponds to a 3-level slicer with decision regions specified by two thresholds which are adaptable in proportion to the output of the adaptive reference circuit 138. For example the threshold may be equal to $2^3$. ARC. The region between the positive threshold and the negative threshold is referred to as the "hold" or "dead zone".

The phase quantizer 206 is followed by a digital-to-analogue converter 208 which generates a corresponding voltage to control an analog voltage controlled oscillator 210.

The output of the voltage controlled oscillator 210 is the recovered "Baud Rate Clock" signal which is applied to the decimator 124 (FIG. 1).

Figure 4:
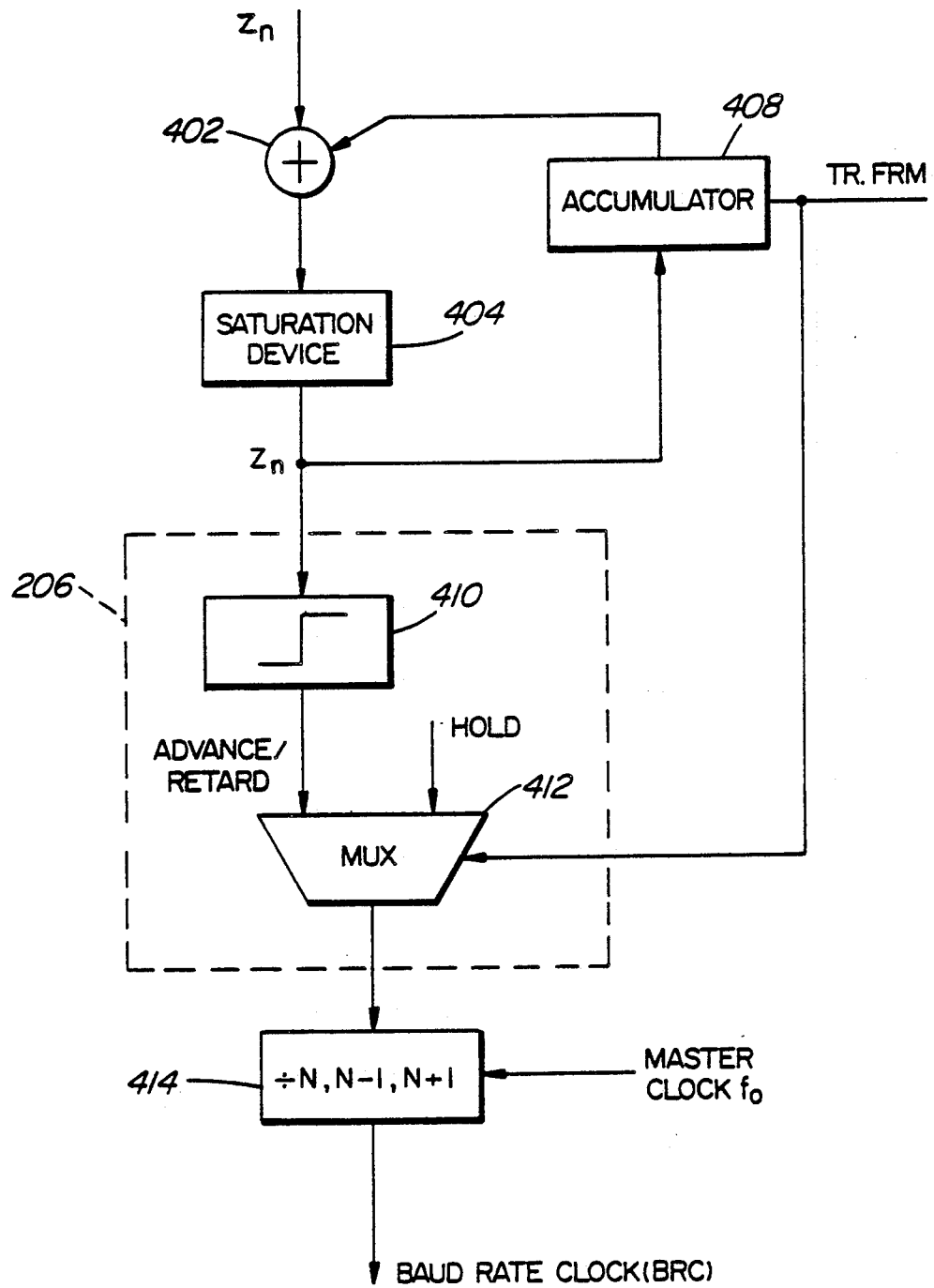
FIG. 4 is a block schematic diagram of the remaining parts which, with the timing estimator, form the timing recovery circuit shown in FIG. 2.
Figure 5:
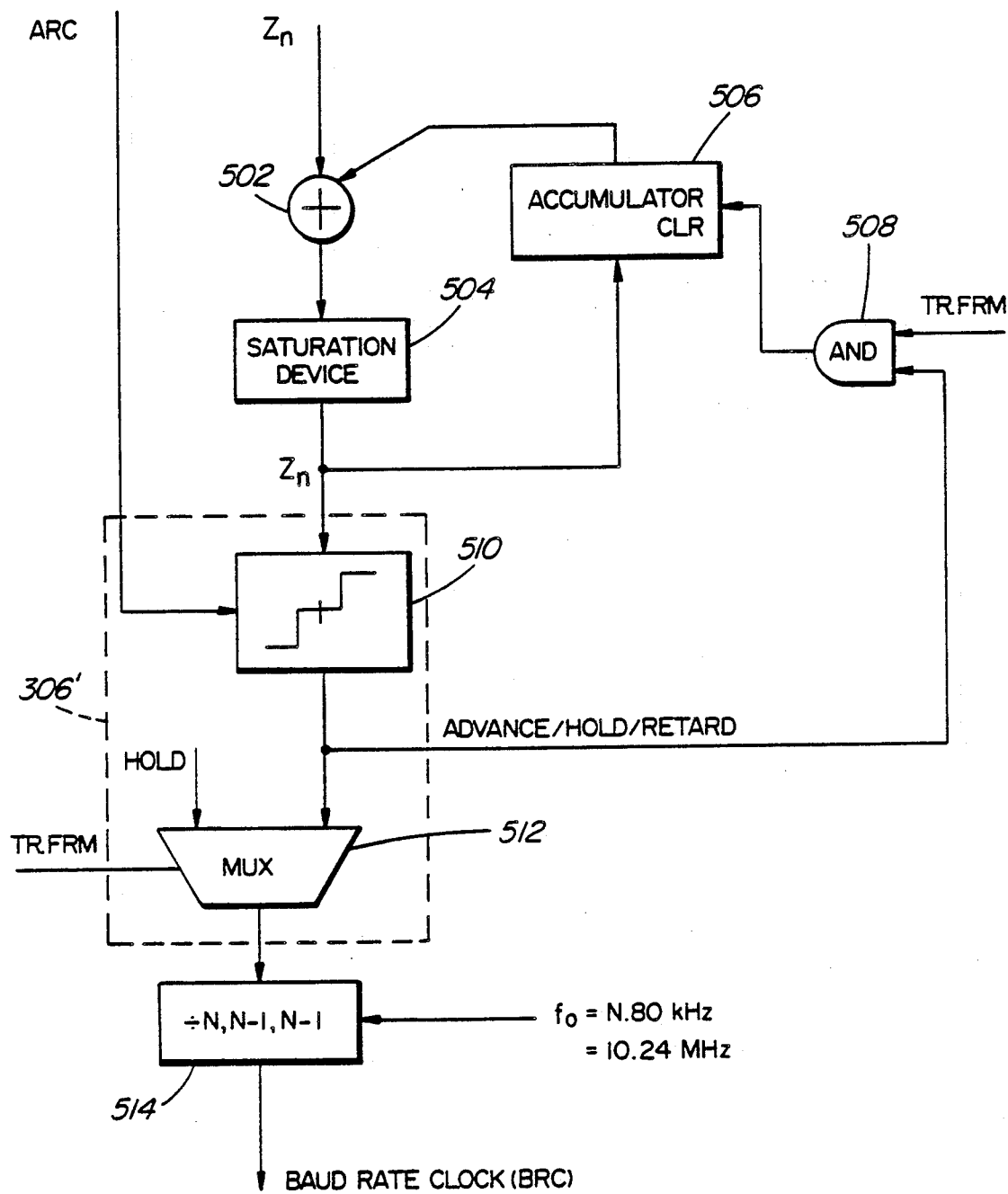
FIG. 5 corresponds to FIG. 4, but shows the parts of a second embodiment of timing recovery circuit.

The digital-to-analogue converter 208 could be omitted and the analog voltage controlled oscillator replaced by a digital voltage controlled oscillator, for example a programmable counter/frequency divider. Such an arrangement is shown in FIGS. 4 and 5 and will be described later.

Figure 3:
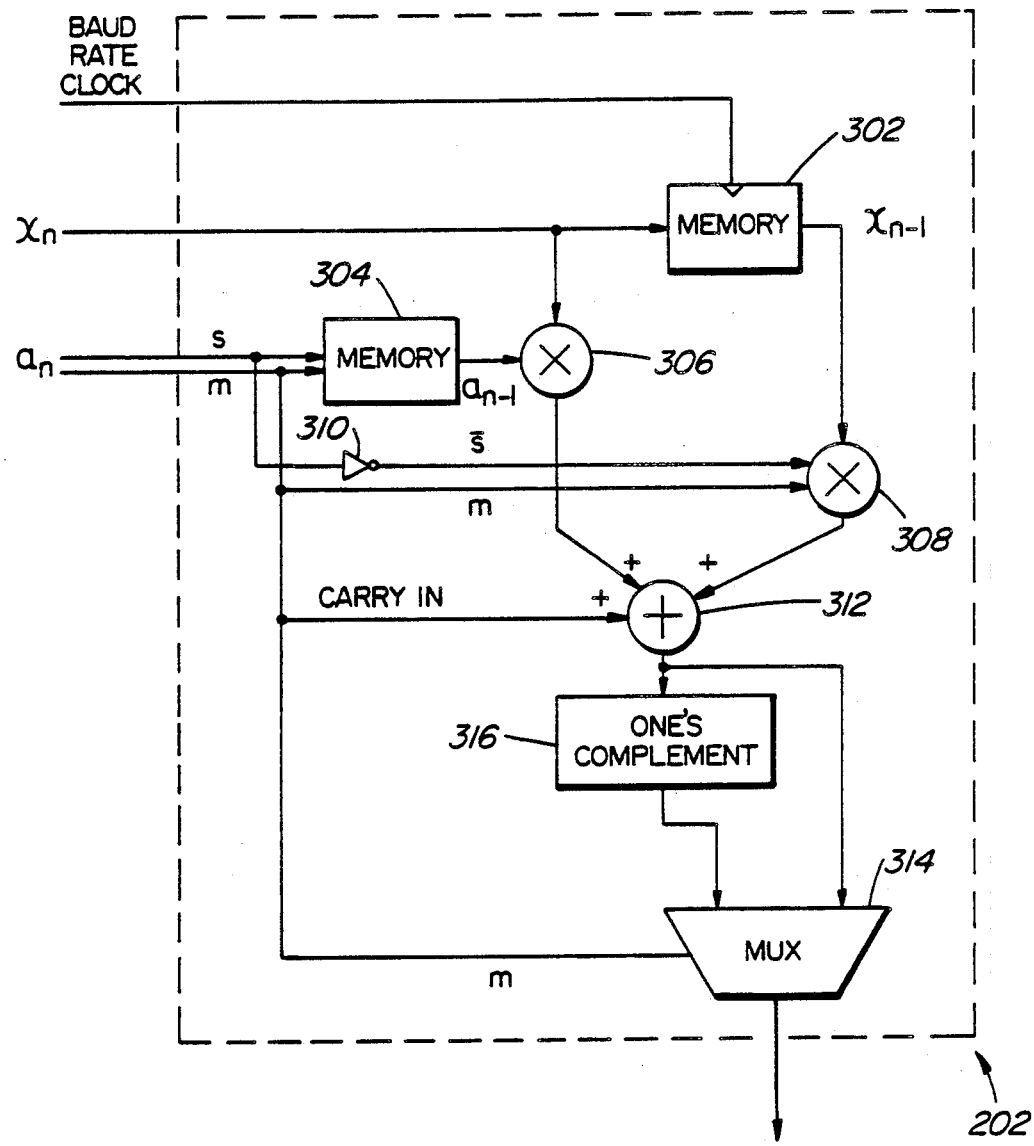
FIG. 3 is a block schematic diagram of a timing estimator of the timing recovery circuit of FIG. 2.

FIG. 3 shows the timing estimator 202 in more detail. The signals $x_n$ and $a_n$ are stored in two memory locations 302 and 304, respectively, which are updated every baud by the baud rate clock signal and used as the "previous" baud values $x_{n-1}$ and $a_{n-1}$ in the following baud period.

The data symbols are repeated as 2-bit values but, to simplify the drawing, only the inputs to memory location 304 and multiplier 308 show them separately—for symbol $a_n$. One bit is for sign information (s) and the other bit (m) is for magnitude information, to represent one of the four values $-3$, $-1$, $+1$, or $+3$. The "present" symbol $x_n$ and the "previous" symbol $x_{n-1}$ from the output of memory location 302 are then multiplied by the "previous" and "present" slicer outputs $a_{n-1}$ and $a_n$, respectively, by means of multipliers 306 and 308, respectively. An inverter 10 inverts the sign bit (s) of symbol $a_n$ before its application to the multiplier 308. The magnitude bit (m), however, is multiplied without inversion.

The output of multiplier 308 is summed with the output of multiplier 306 by adder 312 with "carry in" set when m=1. The sum from adder 312 is applied to a multiplexer 314. A one's complement device 316, derives the negatived value of the output of the adder 312 and applies it to a second input of the multiplexer 314. Switching of the multiplexer 314 is controlled by the magnitude bit m of the recovered far-end symbol $a_n$ from the input to the timing estimator 202. The output of the multiplexer 312 is the value $z_n$, within a scale factor which can be absorbed by the threshold of the phase quantizer 206 (FIG. 2). It should be noted that the required multiplication is implemented efficiently, needing only an adder, a shifter and a one's complementer, with suitable mapping of the 2-bit values to perform a specific combination of these functions.

Referring now to the impulse response shown in FIG. 6, the specific feature of the impulse response that is central to this timing recovery arrangement is the distance between the peak of the main pulse 600 and the zero crossing 606 between the precursor 602 and the main pulse 600. Nominally this is approximately one baud, as can be seen from FIG. 6. This condition can be expressed more exactly by defining a timing function. If we denote the impulse response, which includes the receive filter, by h(t), and the sampling phase by t, then the timing function f(t) is defined as $$f(t) = (1/r)h(t) - h(t-T)$$

where 1/T is the baud rate, h(t) and h(t−T) denote the main pulse and precursor, respectively, and r is the ratio between the main pulse sample and the precursor pulse sample.

Generally, desired sampling phase $t_0$ is defined such that $$f(t_0) = 0$$

In other words, it is the phase for which the main cursor-to-precursor ratio reaches a predefined value r. A particularly useful case is that obtained when r tends to infinity, i.e. the sampling instant coincides with the zero crossing and hence the precursor tends to zero, in which case the timing function can be reformulated as follows: $f(t) = -h(t-T)$.

This means that the correct sampling phase is reached when the precursor sample equals zero. Hence, in a practical embodiment, correct timing will be achieved by adjusting the sampling instant until the precursor sample value is zero.

The timing estimator 202 computes an estimate of the timing function, referred to as the timing estimate $z_n$, according to the following expression;

$$z_n = (-1)^m (a_{n-1}x_n - a_n x_{n-1})$$

where m is the magnitude bit of the 2B1Q symbol $a_n$ (m=0 for +1 and −1).

A timing estimate for $f(t) = (1/r)h(t) - h(t-T)$ can be obtained by making use of the expression derived from $z_n$, which is basically a precursor estimate, is estimate of h(t−T). An estimate of h(t) is readily provided by the adaptive reference tap ARC. With the combination of these two estimates ($z_n$ and ARC) an estimate $y_n$ of f(t) can be formed as:

$$y_n = (ARC/r) - z_n$$

An alternative implementation would be to simply compute $z_n$ at every baud and carry out the averaging over the full frame, and introduce ARC in the final term only at the end of the frame, prior to phase quantization. This can be done by adding a scaled version of ARC, including r in it, adding it to the averaged $z_n$, and feeding the result to the phase quantizer.

An advantage of such implementations is that they are relatively easy to implement because manipulation of the symbols 1 and 3 requires merely the shifting and adding of the binary values.

Referring now to FIG. 4, which shows the remainder of the timing recovery circuit 124, in the loop filter the signal $z_n$, from the timing estimator 202 (FIGS. 2 and 3) is summed with an accumulated value from an accumulator 408 which is periodically reset by the frame signal TR-FRM which is set to one during one baud of the frame and is otherwise equal to zero. This frame signal signals to the timing recovery circuit that it is time to make a decision on a phase jump. In the ISDN-U case TR-FRM is generated by a frame search circuit which tries to find the location of the frame synchronization word. The output of the summer 402 is applied to the accumulator 408 by way of a saturation device 404 which serves to detect overflow or underflow of the incoming signal and correct for it without wrap-around. (This saturation device 404 could be omitted if the hardware were designed to have a capacity equal to the maximum number of bits anticipated in the signal).

The output of the saturation device 404 is also applied to a slicer 410. Depending upon the polarity of the signal it receives the slicer 410 puts out one or other of two signals, ADVANCE and RETARD. These are applied to a multiplexer 412 which is switched by the transmitter frame signal TR.FRM to select between the "hold" condition and the output of the slicer 410. The output of multiplexer 412 is applied to divider 414 which takes a nominal high frequency master clock, $f_0$, for example 10.24 MHz in the case of ISDN-U, and divides it by N, N−1, N+1. The ADVANCE or RETARD signals adjust the divider 414 which cause the shift in phase of the recovered Baud Rate Clock, and hence adjusts the sampling instant.

The accumulator 408 will average the signal over one frame, being reset at the end of the frame. When it is reset, i.e. TR-FRM=1, and after the last symbol has been taken into account in the computation, it will then switch the multiplexer 412 from "hold" to pass the value from the slicer 410 through to divider 414. Immediately thereafter, the multiplexer 412 will switch back to "hold" for the accumulation of the next frame of bits.

As shown in FIG. 4, the divider 414 is a digital voltage controlled oscillator, typically a programmable counter. This is equivalent to the digital-to-analogue converter 208 and analogue voltage-controlled oscillator shown in FIG. 2. It should be noted also that the frequency $f_0$ applied to the divider, being 10.24 MHz, can be divided down to 80 Khz, using a value of N=128.

Referring now to FIG. 5, which shows an alternative and preferred embodiment of the loop filter/phase quantizer part of the circuit, the output $z_n$ of the timing estimator 202 (FIGS. 2 and 3) is applied to a summer 502. A saturation device 504 detects overflow/underflow and prevents wrap-around as in the embodiment of FIG. 4. The output of the saturation device 504 is applied to an accumulator 506. This part of the circuit corresponds generally to the circuit in FIG. 4. The CLR input of the accumulator 506 is controlled by an AND gate 508 which has one input controlled by the frame pulse TR-FRM and the other connected to the output of a slicer 510. This slicer 510 differs from the slicer 410 used in FIG. 4 in that it has three thresholds—ADVANCE/HOLD/RETARD. Of these three possible outputs, both RETARD and ADVANCE constitute binary '1' levels and HOLD is a zero. When binary '1' (ADVANCE/RETARD) appears at the output of slicer 510, it is applied also to the second input of AND gate 508. When the frame pulse TR-FRM and the ADVANCE/RETARD pulse are present together, the AND gate 508 resets the accumulator 506 which restarts the averaging of the input signal $z_n$. Thus, in this embodiment the accumulator 506 is not necessarily reset by every frame pulse TR-FRM. Only when the transmit frame pulse TR-FRM occurs when the slicer 510 is calling for advancing or a retarding of the sampling phase will the accumulator 506 be reset. In the absence of such a call, the accumulator 506 will continue to average the signal $z_n$ and the slicer 510 will be in its dead zone or HOLD condition. This dead zone corresponds to a precursor sample in the vicinity of point 606 in FIG. 6 that is approximately zero. As the frequency starts to drift and the estimated precursor value starts to increase, it will remain in the dead zone for a certain period of time. Eventually its amplitude will become great enough to exceed one of the thresholds which will then trigger a call to either advance or retard the phase. A benefit of this dead zone is a reduction in jitter of the sampling instant.

The output of the slicer 510 is applied by way of a multiplexer 512 to a digital voltage controlled oscillator or programmable counter 514 which delivers the baud rate clock as its output. Multiplexer 512 and programmable counter 514 correspond to the multiplexer 412 and programmable counter 414 shown in FIG. 4 and are connected and operate in the same way.

It should be noted that the three-level slicer 510 has a further input for the adaptive reference control signal (ARC) from adaptive reference circuit 138 (FIG. 1). The ARC signal is used to determine the threshold levels of the slicer. The ARC circuit 138 is designed to accommodate variations in the data signals due to different loop configurations (length, bridge taps, gauge, etc.) and adjust the thresholds to take account of the differences in amplitude i.e., a relatively small signal from a long loop would be the equivalent of a much larger signal from a short loop because of the variations in attenuation.

The ARC signal is also used to adjust the thresholds in the slicer of the timing recovery circuit 124 (FIG. 1). An advantage of using the ARC signal is that it avoids having to put a gain controller before the adaptive threshold slicer 136 (FIG. 1). It has been found during experiments that a gain control in this position may cause instability due to the gain converging to zero and the DFE/slicer combination oscillating in isolation, at least with 2B1Q signals. The use of the ARC signal to control the slicer thresholds in the timing recovery circuit 124 proved to be a good solution to the problem of stability.

Figure 7:
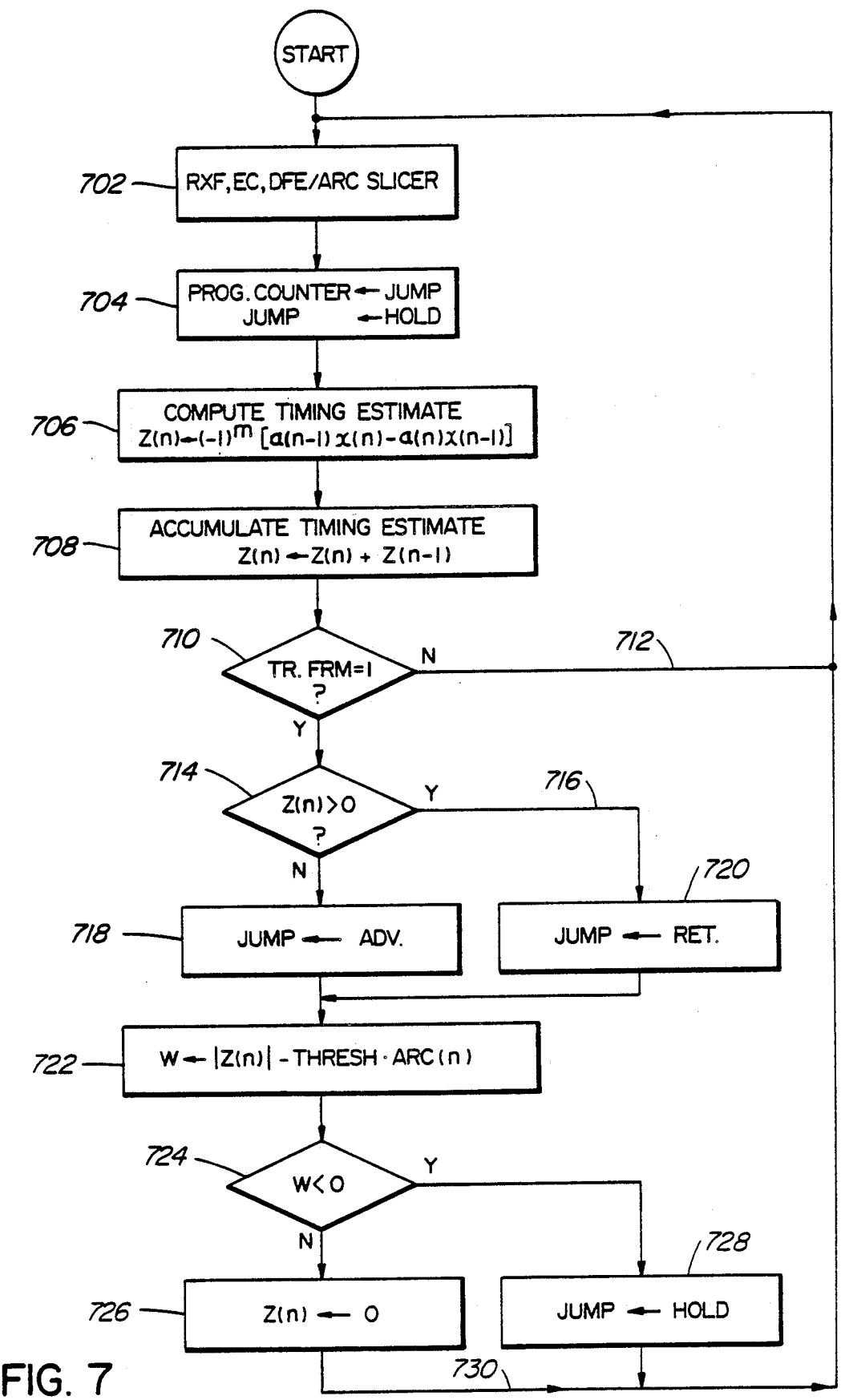
FIG. 7 is a flowchart depicting the operation of the embodiment of FIG. 5 embodied using a digital signal processor with some programmability.
Figure 8A:
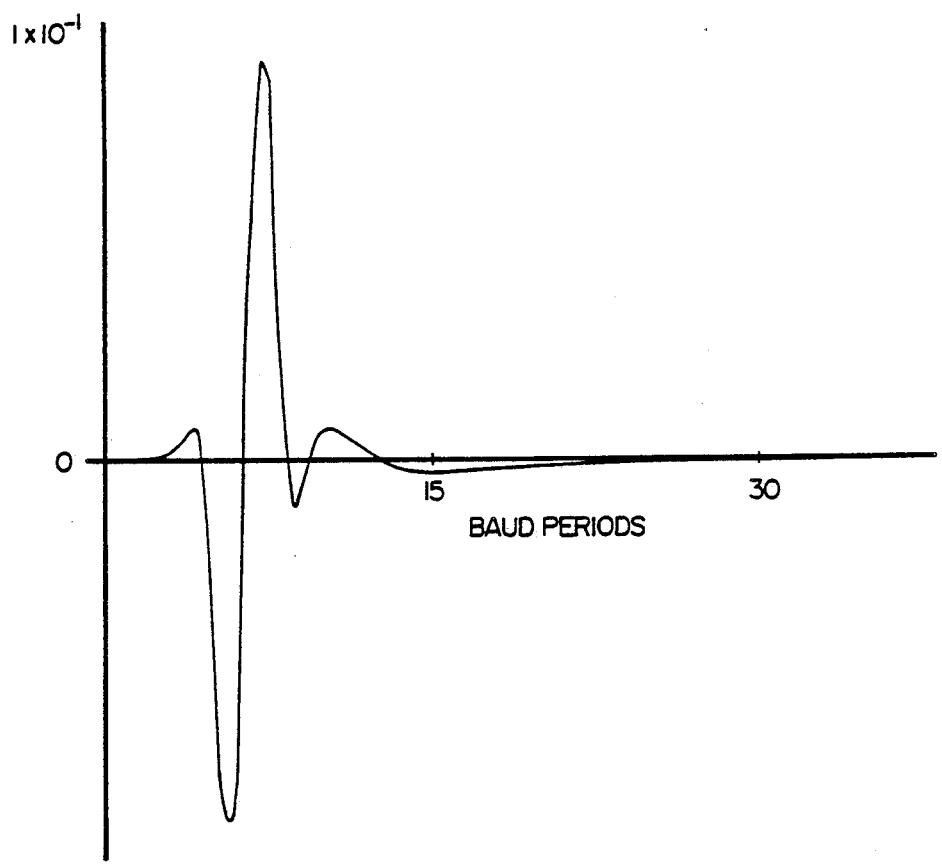
FIGS. 8A and 8B illustrate the echo path response at a point within the interface.
Figure 8B:
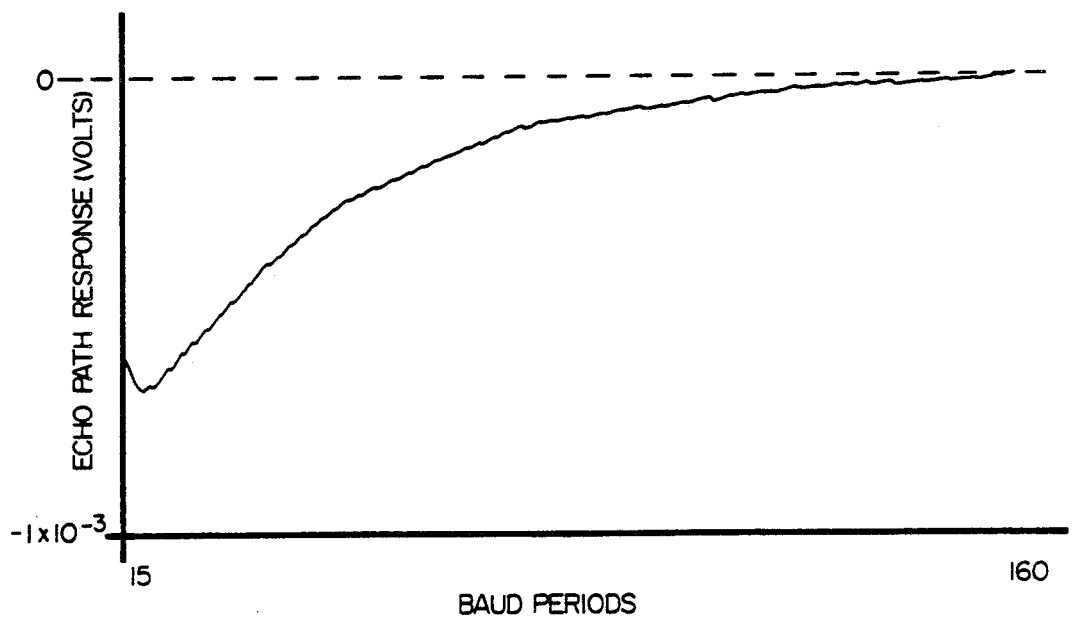

The specific implementation described hereinbefore is for illustration only, the preferred implementation of at least the timing recovery circuit, including timing estimator, loop filter and phase quantizer, being by means of firmware, specifically a programmable digital signal processor. Operation of such a digital signal processor implementation is illustrated by the flowchart shown in FIG. 7, which relates specifically to the U-interface modified as illustrated in FIG. 5.

As mentioned earlier, the receive filter 126, echo canceller 128, and decision feedback equalizer 130 operate to clean up the signal before slicing by slicer 136. In the flowchart these operations and that of the slicer 136 are represented by process step 702. Thus the completion of step 702 corresponds to completion of the slicing step and in step 704 the programmable counter 514 (FIG. 5) has its phase adjusted, i.e. is instructed to perform a phase jump. The register containing the value JUMP has HOLD written into it, in effect the function of switching the multiplexer 512 to the HOLD position. The frequency divider 514 uses this register to obtain the ratio by which the master clock has to be divided. This HOLD condition prevents the programmable counter 514 being instructed to perform a phase jump during the period that the circuit is accumulating a new value for $z_n$. In step 706 computation of the timing estimate $z_n$ takes place. Computation of the timing estimate $z_n$ is performed in the timing estimator 202 and the individual values of $z_n$ for each baud are accumulated over a complete frame as indicated by step 708 to give Z(n), $$Z(n) = z(n)3\ Z(n-1)$$

When a frame has been accumulated, decision step 710 determines whether or not the frame pulse TR.FRM is asserted If the frame pulse is not asserted, loop 712 takes the process back to the beginning and another baud is processed. If it is, decision step 714 determines whether or not Z(n) is greater than zero. If Z(n) is greater than zero, path 716 and process step 718 write ADVANCE into the JUMP register. In the subsequent process step 722, a value W is computed as the magnitude of the function Z(n) minus the product of the threshold and the adaptive reference control signal ARC(n). Thus step 724 determines whether W is less than zero or not, and in so doing effectively compares the magnitude of the timing estimate with the threshold, as adapted by the ARC signal. If W is less than the threshold, i.e. within the dead zone, decision step 724 causes the HOLD signal to be written into the JUMP register, step 728. On the other hand, if the value W is equal to or greater than zero, step 726 clears the accumulator for the next frame to be accumulated with zero initial condition (no memory). This is indicated by writing zero into the Z(n) register.

In summary, HOLD refers to the setting for the next baud, JUMP refers to the setting for the current baud. The programmable counter is in fact triggered every baud and will either shift phase or not depending on whether JUMP or HOLD has been programmed. Thus once a frame pulse TR.FRM has been detected by decision step 710, steps 718 and 720 determine the direction of any phase shift depending on the value of Z(n) i.e. to advance or retard the programmable counter. Step 722 determines whether or not the value $Z_n$ is still within the dead zone. If it is, no phase shift will be performed, and decision step 724 will cause the process step 728 to maintain HOLD in the jump register. It should be noted that, when a phase jump must be made (decision to ADVANCE OR RETARD) no change is made to Z(n). This implies, in effect, that the accumlation in the next frame will continue with the current Z(n) being used as the initial condition. If Z(n) is out of the dead zone, the requirement is for the programmable counter to phase shift. This automatically means that the next time it is triggered it will transfer a JUMP value, for example 127, as the increment by which it will shift phase. This value is determined by the register contents as set by step 718 or 720. Finally as mentioned previously, process step 726 clears the accumulator at the beginning of the next frame, and loop 730 returns the process to the start to process the next baud.

Figure 9:
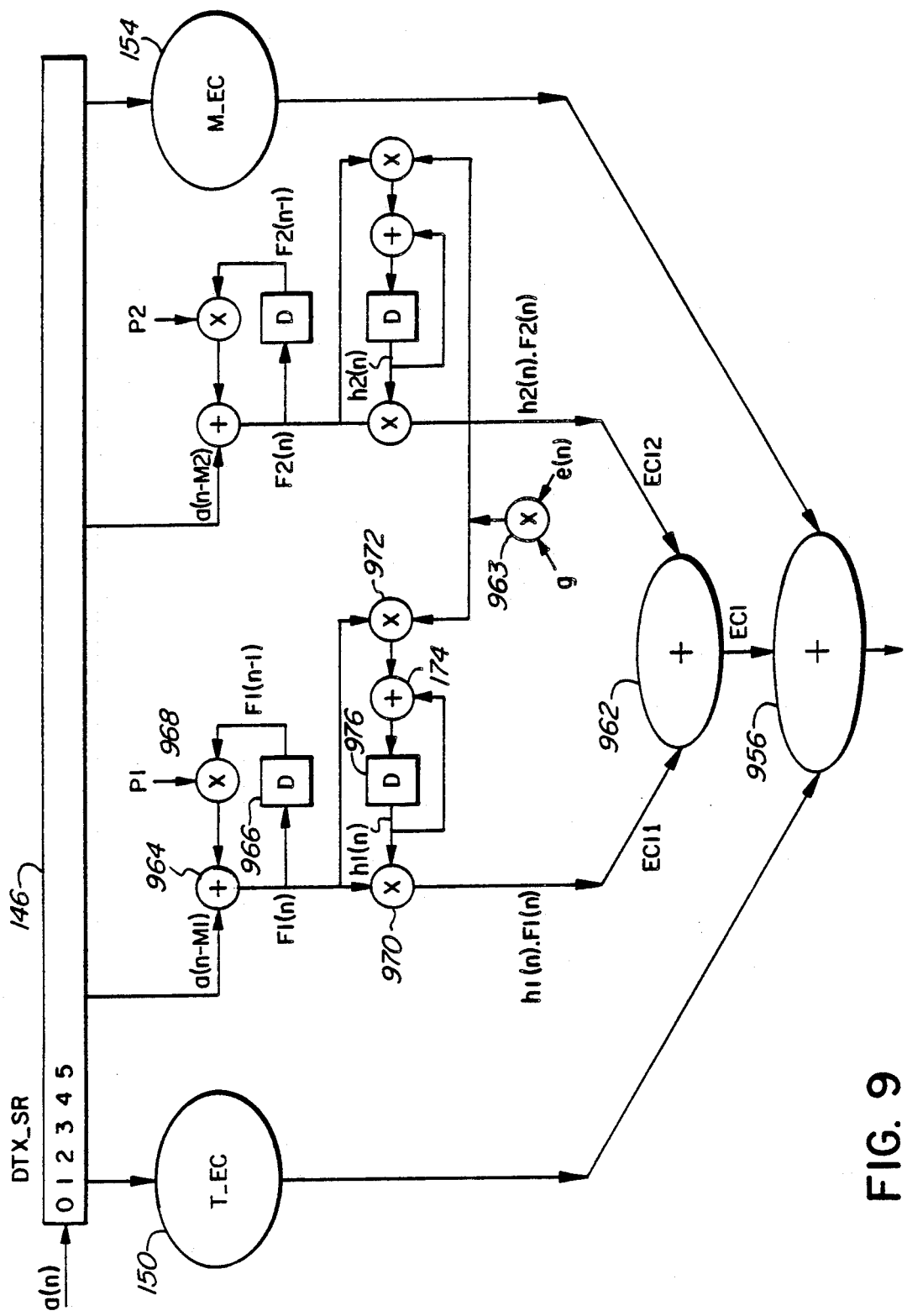
FIG. 9 is a block schematic diagram illustrating the pulse response echo canceller part of the interface of FIG. 1.
Figure 10A:
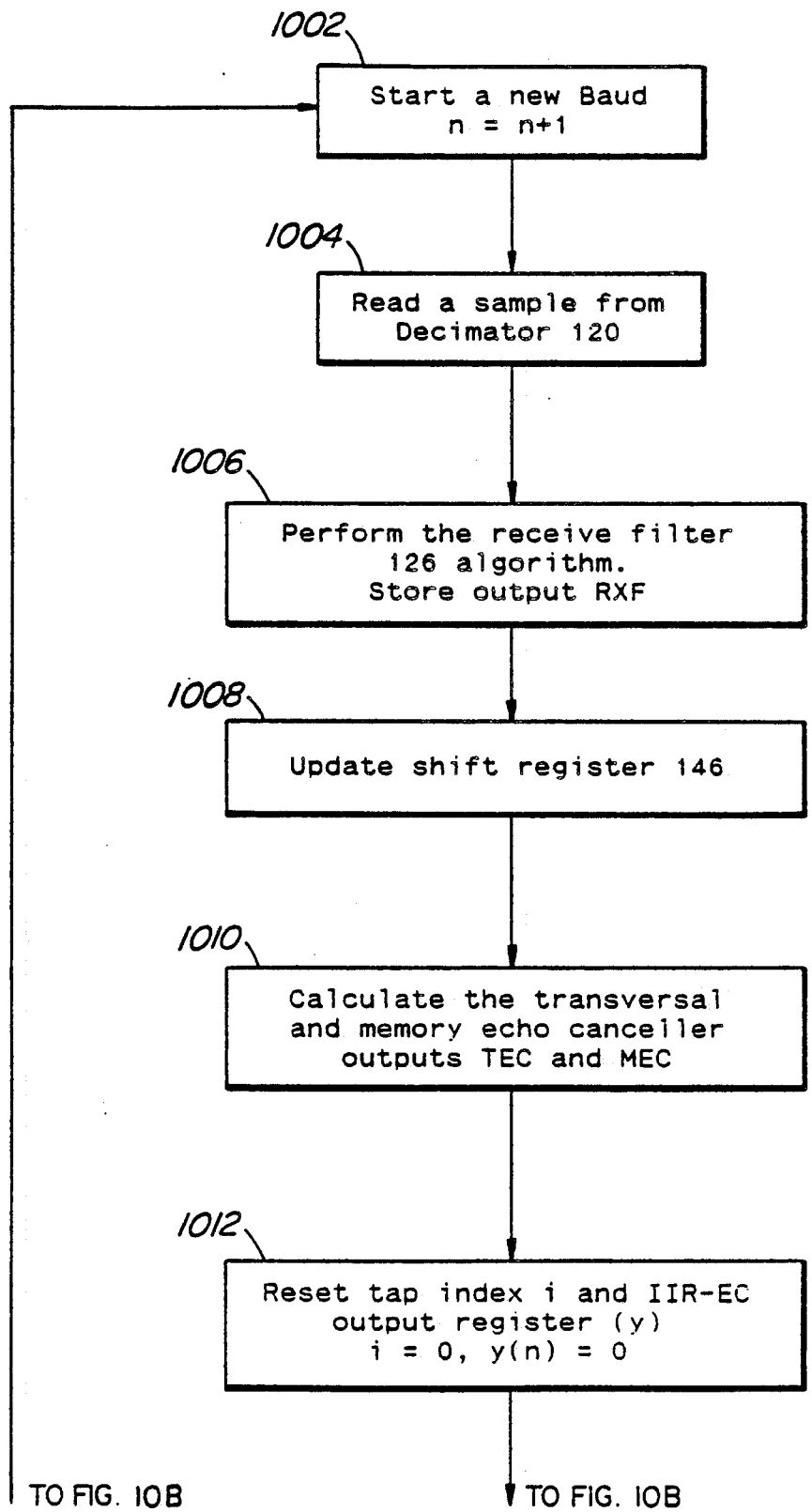
FIGS. 10A-10D is a flowchart representing the operation of a digital signal processor implementation of the echo canceller.
Figure 10B:
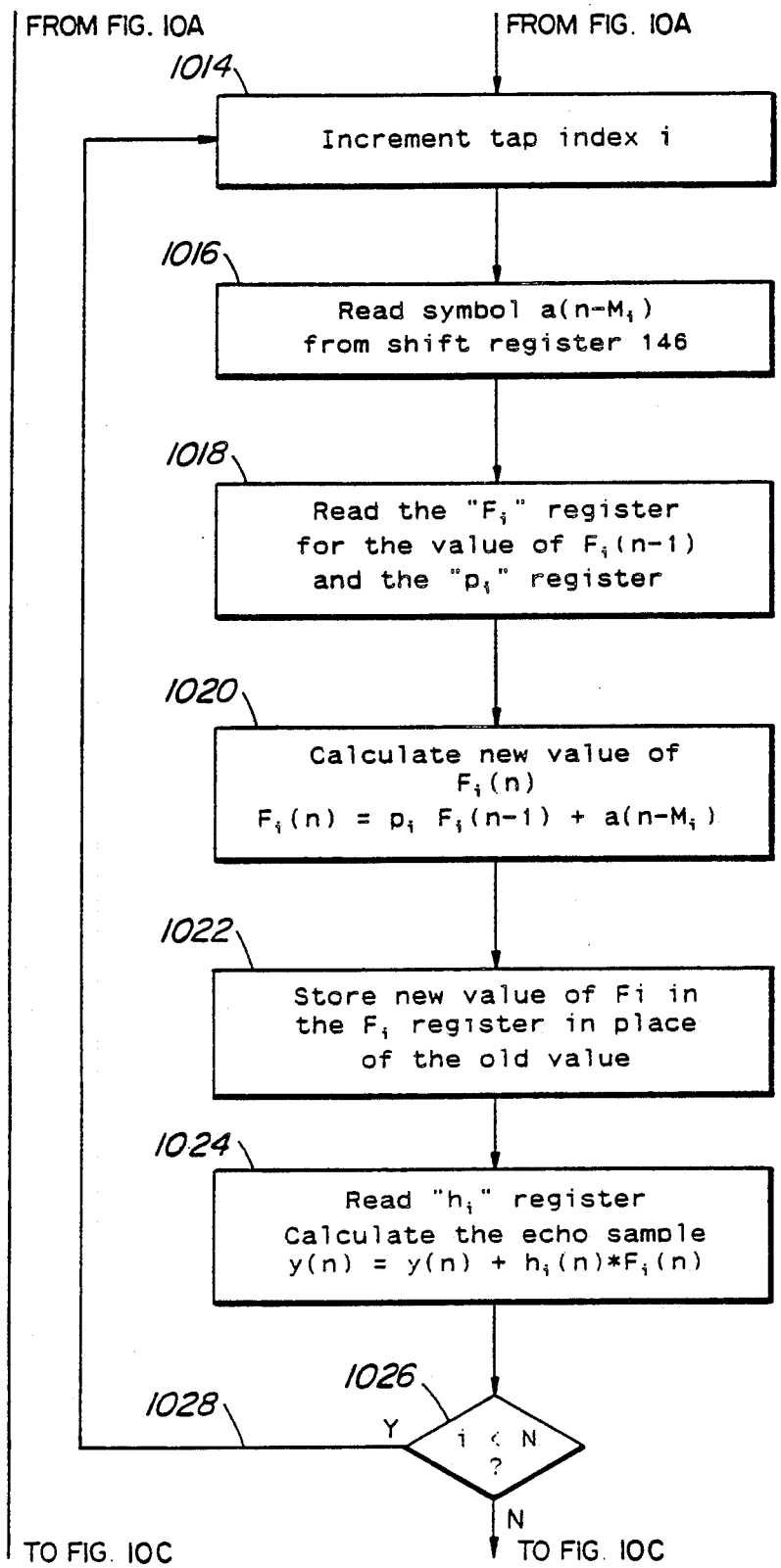
Figure 10C:
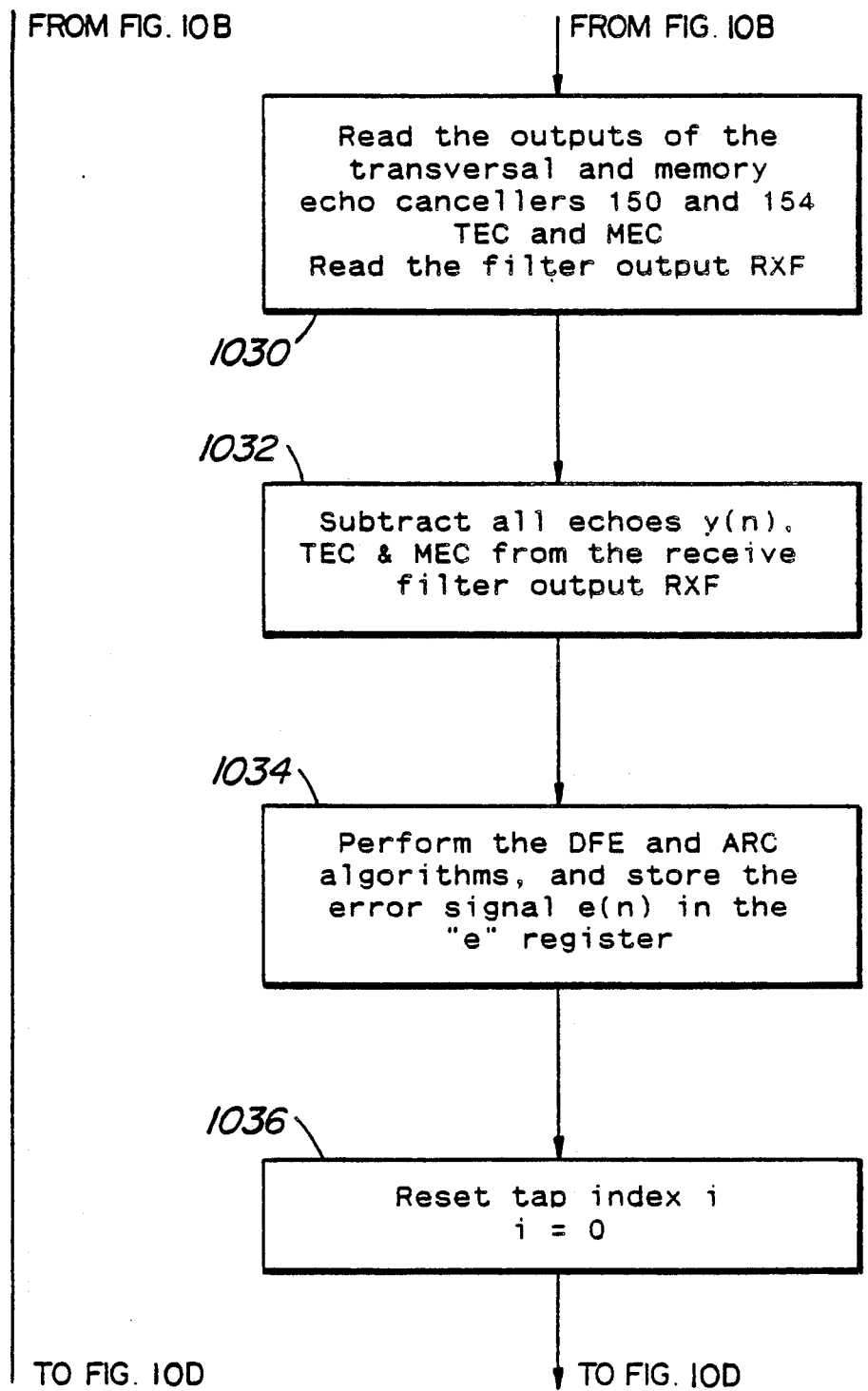
Figure 10D:
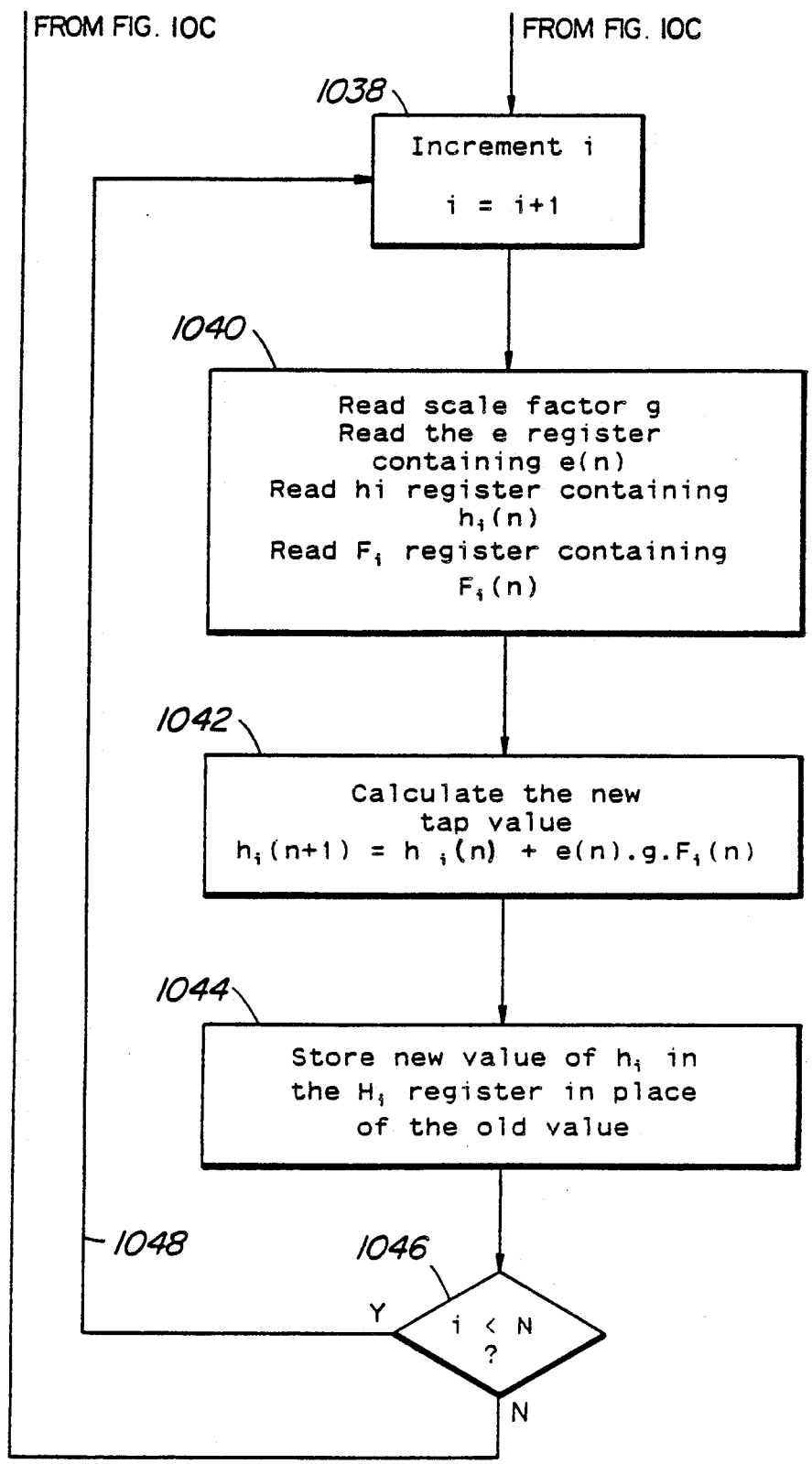

The infinite pulse response echo canceller is shown in more detail in FIG. 9 and a flowchart of its operation is shown in FIG. 10.

The echo canceller 128 is fabricated using a digital signal processor. It is represented schematically, however, in FIG. 9, which also shows the transversal filter echo canceller 150 and memory echo canceller 154, though not in detail since they may be of known construction. The infinite pulse response echo canceller 152 is shown as having two taps, for the signals $a(n-M_1)$ and $a(n-M_2)$, respectively, from the shift register 146. The outputs of the two taps, designated ECI1 and ECI2, respectively, are summed by summing means 962, the output of which is summed with the outputs of the transversal filter echo canceller 150 and memory echo canceller 154 by summing means 956, as previously mentioned.

Since both taps are similar in construction, only one will be described—that for the signal $a(n-M_1)$. The baud sample $a(n-M_1)$ from the shift register 146 is applied to a summing means 964. The output of summing means 964 is connected to a one baud delay 966, the output of which is connected to one input of a multiplier 968 which has a second input set to a reference level $P_1$. The output of the multiplier 168 is connected to a second input of the summing means 964. Thus, the loop formed by summing means 964, delay 966 and multiplier 968 sums the weighted values of successive samples of $a(n-M_1)$ to give the value $F_1$, at any instant, at the output of summing means 964.

The output of summing means 964 is applied to multipliers 970 and 972, respectively. Multiplier 972 multiplies the signal $F_1(n)$ by the product of the adaptation error signal $e(n)$, from the output of summing means 160 (FIG. 1), and the scale factor g, such product being derived by a multiplier 963. The product of multiplier 972 is supplied to one input of a summing means 974, the output of which is supplied to a one baud delay 976. The output of delay 976 is supplied to a second input of multiplier 970 and a second input of summing means 974.

The multiplier 972, summing means 974 and delay 976 produce the value of function $h_1(n)$ which, multiplied by function $F_1(n)$ by means of multiplier 970 gives $h_1(n).F_1(n)$ as the output of the tap, which is supplied to summing means 962.

As mentioned previously, the second tap is similarly constructed and operates in a similar way upon the sample $a(n-M_2)$ to give the value $h_2(n).F_2(n)$. Summing $h_1(n).F_1(n)$ and $h_2(n).F_2(n)$ gives y(n) at the output of the multiplier 962.

Operation of the echo canceller is depicted by the flowchart in FIG. 10.

In the digital signal processor implementation, permanent registers are assigned to g, $p_i$, $F_i$, $h_i$; i=1, N and $a(n-M_i)$; =1..Max ($M_i$). Temporary registers are provided for i, y(n) and e.

Referring to FIG. 10, the cycle begins with the selection of a new baud, step 1002, and a new sample is read from the decimator 120, step 1004. The algorithm for the receive filter 126 is performed, step 1006, and the output (RXF) of receive filter 126 is stored. Step 1008 updates the shift register 146, i.e. shifts the new input symbol into the shift register 146, at the same time shifting the contents one position. Step 1010 calculates the outputs TEC and MEC of the transversal echo canceller 150 and memory echo canceller 154, respectively. Step 1012 resets the tap index i and output (y) of the IIR echo canceller 152 so that i=0, y(n)=0.

The tap index i is then incremented, step 1014, following which the symbol $a(n-M_i)$ is read from the shift register 146, step 1016. The $F_i$ register is then read, together with the $p_i$ register for the values $F_i(n-1)$ and $p_i$, respectively (Step 1018).

The new value of $F_i(n)$ is then calculated, step 1020, according to the expression:

$$F_i(n) = a(n-M_i) + p_i F_i(n-1)$$

The new value of $F_i$ is stored in the $F_i$ register, replacing the old value, (step 1022). In step 1024, the $h_i$ register is read and the echo sample y(n) calculated according to the expression:

$$y(n) = y(n) + h_i(n)*F_i(n).$$

If all the taps have not been computed, decision step 1026, the loop 1028 causes the process steps 1014 to 1024 to be repeated. When all taps have been done, the outputs of the transversal echo canceller 150, memory echo canceller 154, and receiver filter 126, TEC, MEC and RXF, respectively, are read, (step 1030). The resulting echo values y(n), TEC and MEC are subtracted from the output RXF of the receive filter 126, step 1032. The algorithms for the decision feedback equalizer 130 and adaptive reference control circuit 138 are then performed, step 1034, and the error signal e(n) stored in the appropriate register. As mentioned previously, the error signal e(n) is used by the echo canceller 128 as well as the decision feedback equalizer 130 and adaptive reference control 138.

At this point the tap index i is reset to zero, step 1036. The final sequence of operations uses the error value e(n) to update all of the taps. Thus, step 1038 increments the value of i to i+1. The next step, 1040, reads the scale factor g, the value of e(n) from the 'e' register, the value of $h_i(n)$ from their respective registers, and the value of $F_i(n)$ from the $F_i$ register. The new tap value $h_i(n+1)$ is then calculated as $h_i(n+1) = h_i(n) + e(n).g.F_i(n)$, step 1042. The $h_i$ register is then updated, step 1044, by storing the new value of $h_i$ in the $h_i$ register in place of the old value. If this is not the last tap, N, as determined by decision step 1046, the loop 1048 causes the steps 1038 to 1044 to be repeated. When all taps have been completed, decision step 1046 returns the program to the beginning, step 1002, and the next baud is processed.

Figure 11:
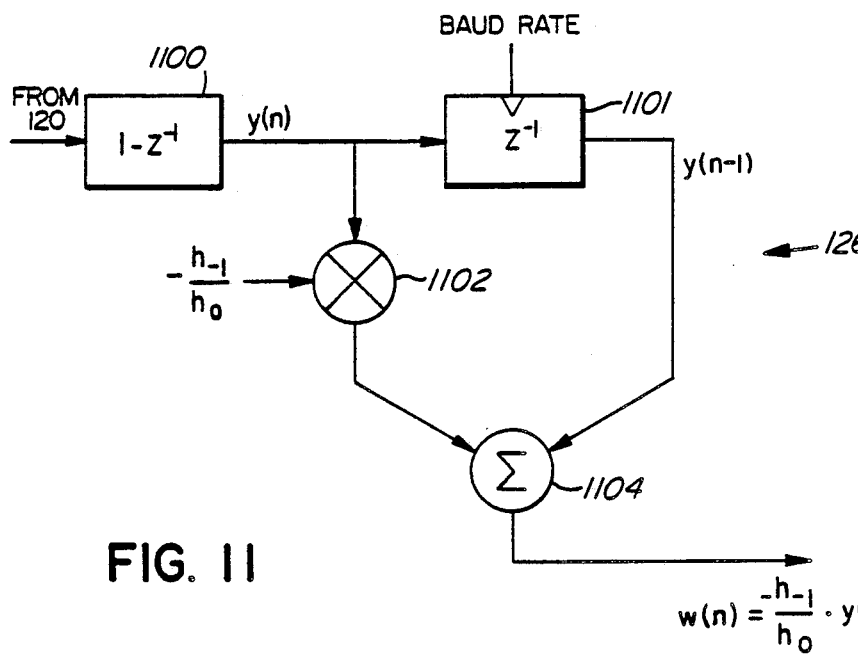
FIG. 11 is a block diagram of one embodiment of a feedforward equalizer filter.
Figure 15:
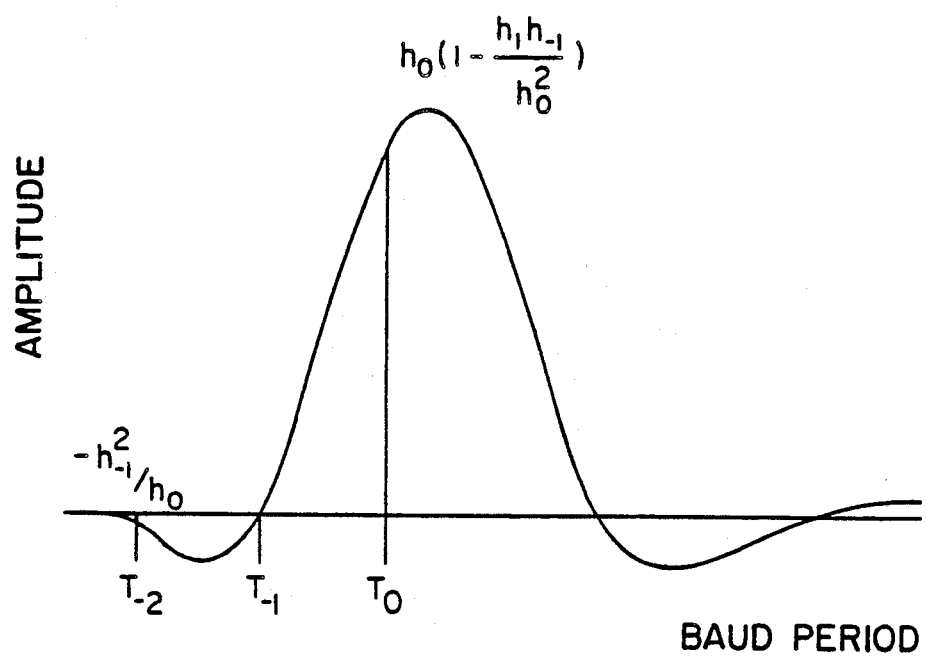
FIG. 15 represents the output of the receive filter for a single transmitted pulse.

The feedforward equalizer, in the form of receive filter 126, will now be described in more detail. Referring to FIG. 11, the receive filter 126 comprises a $(1-Z^{-1})$ filter 1100 in cascade with a precursor equalizer comprising a one baud period delay 1101, a multiplier 1102, and summing means 1104. The input signal (the output of decimator 120) is applied to the $(1-Z^{-1})$ filter 1100, the output of which is applied to the delay 1101 and to the multiplier 1102. Multiplier 1102 serves to multiply the output of the $(1-Z^{-1})$ filter 1100 by the factor $-h_{-1}/h_0$, where $h_0$ is the main cursor height before equalization and $h-1$ is the precursor height before equalization, and supplies the product to summing means 1104. The output of delay 1101 also is applied to summing means 1104. The output of the summing means 1104 represents the value $$w(n) = \frac{-h_{-1}}{h_0} y(n) + y(n-1)$$

and is supplied, as the output of receive filter 126, (RXF) to the summing means 132 (FIG. 1) this output, for single transmitted pulse, is represented by FIG. 15.

In FIG. 15, $h_1$ and $h_0$ are as previously defined and $h_1$ is the first postcursor height before equalization.

Figure 12:
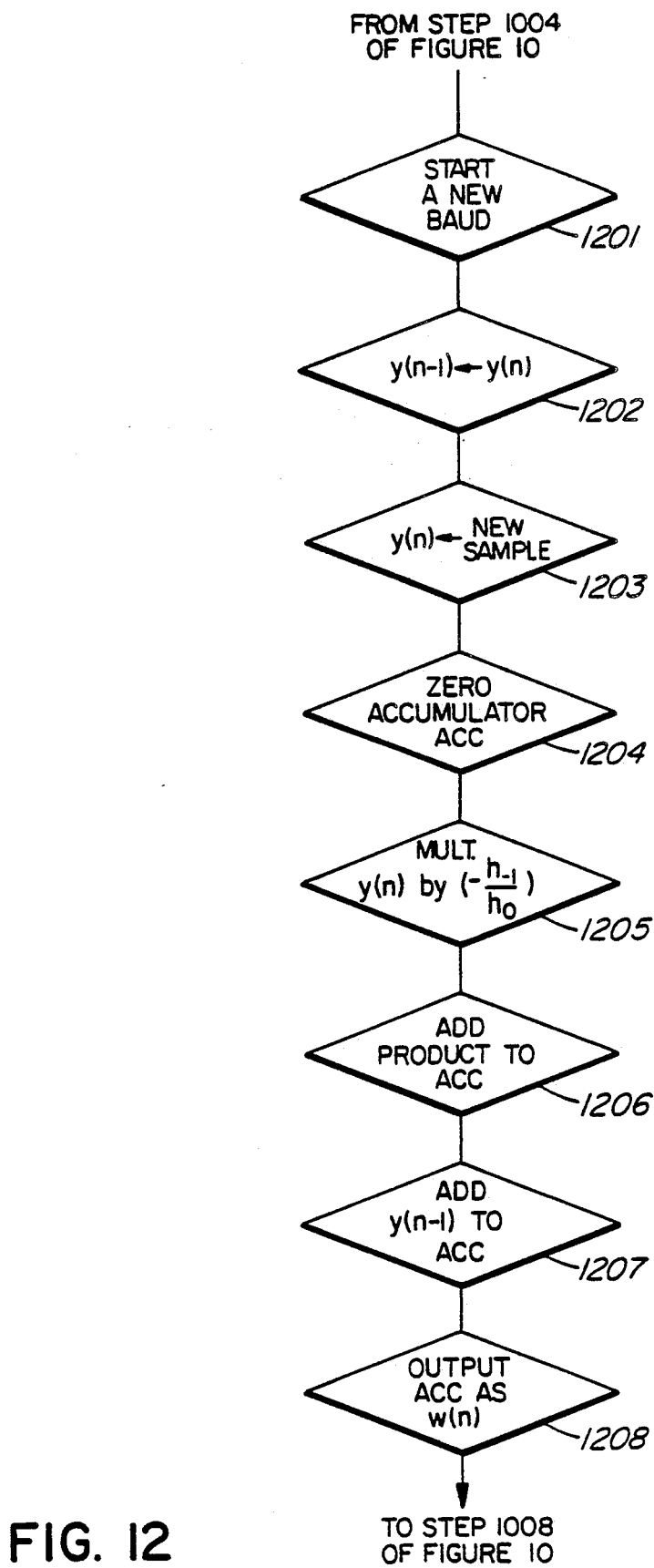
FIG. 12 is a flowchart for the feedforward equalizer shown in FIG. 11.

The operational sequence, corresponding to step 1006 in FIG. 10, is illustrated in FIG. 12. Permanent registers are provided for the values $y(n-1)$. Thus, step 1201 starts a new baud. Step 1202 replaces $y(n-1)$ by $y(n)$. In step 1203 a new sample is read from the output of $(1-Z^{-1})$ is called $y(n)$. The accumulator (not shown) is then zero-ed, step 1204, following which multiplier 1102 multiplies the signal $y(n)$ by the factor $-h_{-1}/h_0$, step 1205 and adds the product to the accumulator, step 1206. The previous input sample $y(n-1)$ is then added to the accumulator in step 1207. Finally, the contents of the accumulator are output to summing means 132 in step 1208.

This first order filter will produce a pulse response as shown in FIG. 15, wherein it will be seen that the pulse has a distinct zero crossing before the main pulse. This is due primarily to a "peaking" of the pulse by increasing the high frequency content relative to the lower frequency content, as previously discussed.

Figure 13:
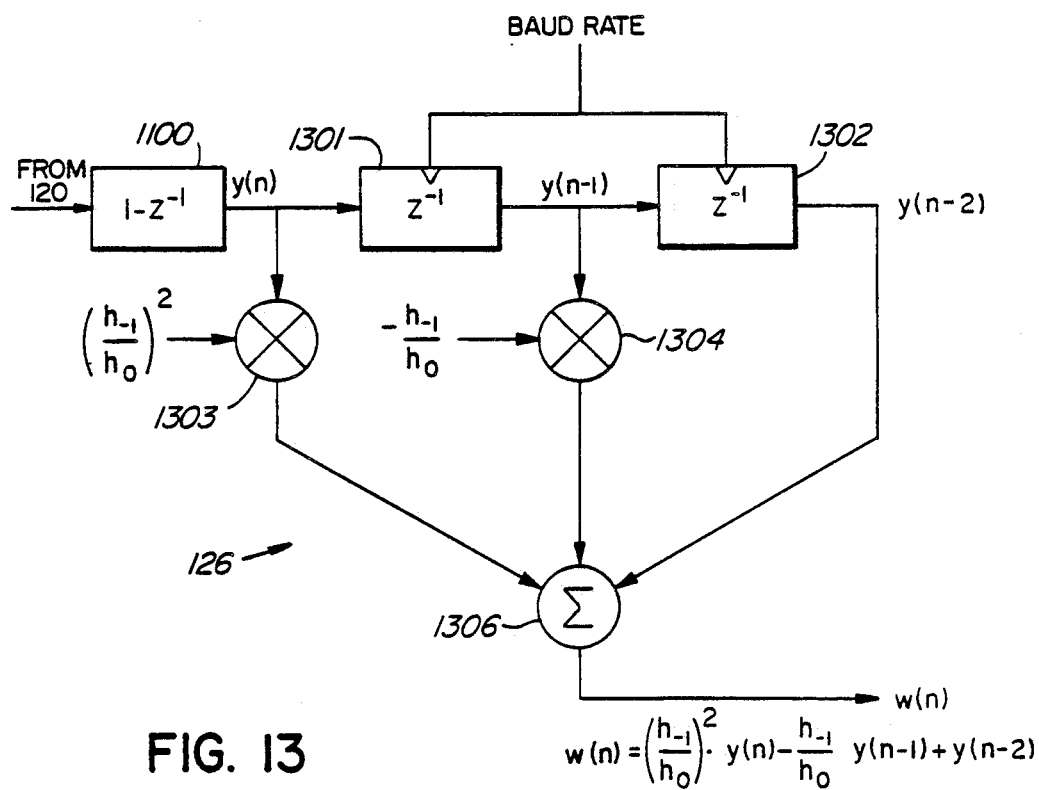
FIG. 13 is a block diagram of a second embodiment of feedforward equalizer.

To produce the pulse response shown in FIG. 6, with two precursor zero crossings, a receive filter 126 comprises a second order precursor equalizer as shown in FIG. 13. In this case, permanent registers are provided for the values $y(n-1)$ and $y(n-2)$. The signal $y(n)$ from $1-Z^{-1}$ filter 1100 is applied to the first of two one baud delays, 1301 and 1302, respectively, which are in series and clocked by the baud rate clock. The signal $y(n)$ is also applied to a multiplier 1303, which multiplies it by the factor $(h_{-1}/h_0)^2$. A second multiplier, 1304, multiplies the delayed signal $y(n-1)$, at the output of one baud delay 1301, by $-h_{-1}/h_0$. The signal form the output of delay 1302, and the outputs of the multipliers 1303 and 1304, respectively, are summed by summing means 1306, the output of which is supplied, as the output of the receive filter 126, to the summing means 132 (FIG. 1).

Figure 14:
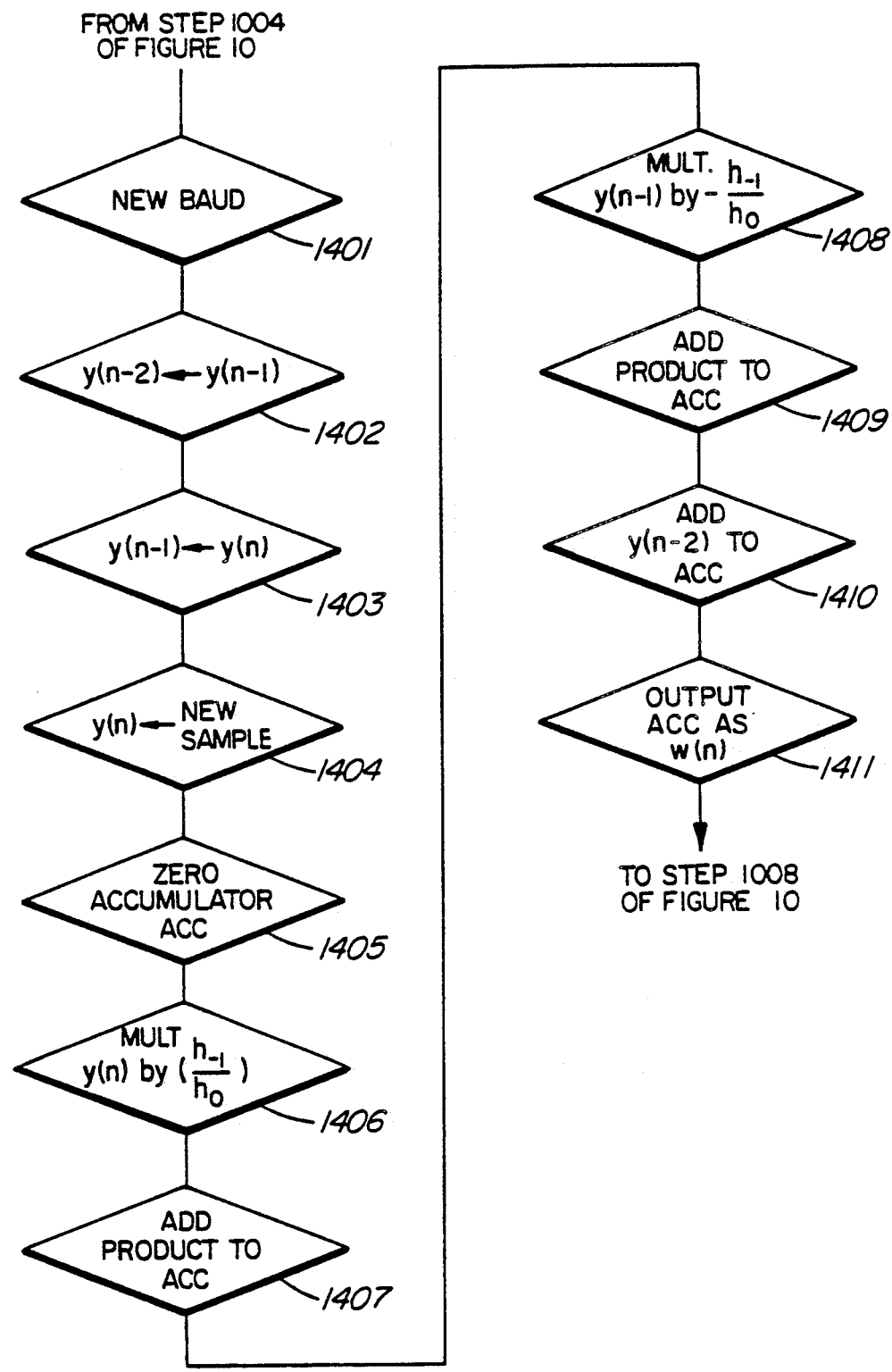
FIG. 14 is a flowchart for the feedforward equalizer shown in FIG. 13.

Referring now to FIG. 14, which illustrates operation of the second order filter equalizer, step 1401 starts a new baud. Step 1402 transfers the old value of $y(n-1)$ into the $y(n-2)$ register, and step 1403 transfers the value of $y(n)$ into the $y(n-1)$ register. In step 1404, a new sample from decimator 120 is read into the $y(n-1)$ register and the accumulator is zero-ed in step 1405. The new sample is multiplied by $(h_{-1}/h_0)^2$ in step 1406 and the product is added to the accumulator in step 1407. In step 1408, the $y(n-1)$ sample is multiplied by $(h_{-1}/h_0)$ and the product is added to the accumulator in step 1409. In step 1410, the sample $y(n-2)$ is added to the accumulator, following which, in step 1411, the contents of the accumulator are stored in memory for use by the summing means 132 (FIG. 1).

Various modifications and alternatives are possible within the scope of the invention. Thus, the invention comprehends a precursor equalizer having a difference equation:

$$w(n) = \beta \cdot y(n) + \alpha \cdot y(n-1) + y(n-2)$$

where:

$$\alpha = -\frac{h_{-1}}{h_0} \cdot \delta$$

$$\beta = \left(\frac{h_{-1}}{h_0}\right)^2 \cdot \delta$$

-continued $$\delta = \frac{1}{1 - \frac{h_1 h_{-1}}{h_0^2}}$$

$y(n)$ is the input to the precursor equalizer, $w(n)$ is its output, $h_0$ is the main cursor height before equalization, $h_{-1}$ is the first precursor height before equalization, and $h_1$ is the first postcursor height before equalization.

This embodiment takes into account three coefficients of the loop response, $h_0$, $h_1$ and $h_{-1}$, and so can give better results, particularly more precise determination of the zero crossings. On the other hand, it is more dependent upon the particular loop.

This modification may be implemented using the circuit of FIG. 13, the coefficients applied to multipliers 1303 and 1304, respectively, being scaled by $\delta$.

In the described embodiment, a $1-Z^{-1}$ delay is provided ahead of the precursor equalizer. The $1-Z^{-1}$ delay may be disposed before the echo canceller and the precursor equalizer after the echo canceller. This would avoid having to provide extra taps in the echo canceller, which otherwise might be necessitated.

We claim:

1. A receiver for a digital data transmission system comprising sampling means having an input for receiving digital data signals from a subscriber loop, said sampling means being operable to sample a received digital data signal, precursor equalizer means for equalizing the output from said sampling means, and timing recovery means for controlling said sampling means in dependence upon the output of said precursor equalizer means, said precursor equalizer means having a difference equation such that the equalized digital data signal has at least one zero-crossing occurring substantially one baud before the main cursor of each pulse, wherein said precursor equalizer means has a difference equation:

$$w(n) = \frac{-h_{-1}}{h_o} y(n) + y(n-1)$$

where n is the baud index, $y(n)$ is the input to the precursor equalizer, $w(n)$ is its output, $h_0$ is the main cursor height before equalization and $h_1$ is the first precursor height before equalization.

2. A receiver as defined in claim 1, wherein said precursor equalizer has a difference equation:

$$w(n) = \left(\frac{h_{-1}}{h_o}\right)^2 \cdot y(n) - \frac{h_{-1}}{h_o} \cdot y(n-1) + y(n-2)$$

where n is the baud index, $y(n)$ is the input to the precursor equalizer, $w(n)$ is its output, $h_0$ is the main cursor height before equalization and $h_1$ is the first precursor height before equalization.

3. A receiver as defined in claim 1, wherein said precursor equalizer has a difference equation:

$$w(n) = \beta \cdot y(n) + \alpha \cdot y(n-1) + y(n-2)$$

where:

$$\alpha = -\frac{h_{-1}}{h_0} \cdot \delta$$

-continued $$\beta = \left(\frac{h_{-1}}{h_0}\right)^2 \cdot \delta$$

$$\delta = \frac{1}{1 - \frac{h_1 h_{-1}}{h_0^2}}$$

and where n is the baud index, y(n) is the input to the precursor equalizer, w(n) is its output, $h_0$ is the main cursor height before equalization, $h_1$ is the first precursor height before equalization, and $h_1$ is the first postcursor height before equalization.

4. A receiver as defined in claim 1, 2, or 3, further comprising a $(1-Z^{-1})$ filter ahead of said precursor equalizer, where $Z^{-1}$ is a delay operator of one baud.

5. A receiver as defined in claim 4, further comprising an echo canceller and means for summing the respective outputs of said echo canceller and said precursor equalizer.

6. A receiver as defined in claim 1, 2 or 3, further comprising a $(1-Z^{-1})$ filter and an echo canceler, said echo canceler having its output applied, in common with the output of the $(1-Z^{-1})$ filter, to the input of the precursor equalizer, where $Z^{-1}$ is a delay operator of one baud.

7. A method of equalization for a receiver for a digital data transmission system, comprising the steps of sampling digital data signals received from a subscriber loop, equalizing the sampled digital data signals using a precursor equalizer, and controlling said sampling means in dependence upon the equalized digital data signal, said precursor equalizer having a difference equation such that the equalized digital data signal has at least one zero-crossing occurring substantially one baud before the main cursor of each pulse, wherein said equalization step uses a precursor equalizer means having a difference equation:

$$w(n) = \frac{-h_{-1}}{h_o} y(n) + y(n-1)$$

where n is the baud index, y(n) is the input to the precursor equalizer, w(n) is its output, $h_0$ is the main cursor height before equalization and $h_{-1}$ is the first precursor height before equalization.

8. A method as defined in claim 7, wherein said equalization step uses a precursor equalizer having a difference equation:

$$w(n) = \left(\frac{h_{-1}}{h_o}\right)^2 \cdot y(n) - \frac{h_{-1}}{h_o} \cdot y(n-1) + y(n-2)$$

where n is the baud index, y(n) is the input to the precursor equalizer, w(n) is its output, $h_0$ is the main cursor height before equalization and $h_{-1}$ is the first precursor height before equalization.

9. A method as defined in claim 7, wherein said equalization step uses a precursor equalizer having a difference equation:

$$w(n) = \beta \cdot y(n) + \alpha \cdot y(n-1) + y(n-2)$$

where:

$$\alpha = -\frac{h_{-1}}{h_0} \cdot \delta$$

$$\beta = \left(\frac{h_{-1}}{h_0}\right)^2 \cdot \delta$$

$$\delta = \frac{1}{1 - \frac{h_1 h_{-1}}{h_0^2}}$$

and where n is the baud index, y(n) is the input to the precursor equalizer, w(n) is its output, $h_0$ is the main cursor height before equalization, $h_{-1}$ is the first precursor height before equalization, and $h_1$ is the first postcursor height before equalization.

10. A method as defined in claim 7, 8 or 9, further comprising the step of filtering said sampled signal using a $(1-Z^{-1})$ filter before equalization by said precursor equalizer, where $Z_{-1}$ is a delay operator of one baud.

11. A method as defined in claim 10, further comprising the step of combining the output of an echo canceller with the output of the precursor equalizer.

12. A method as defined in claim 10, further comprising the step of combining the output of an echo canceler with the output of said $(1-Z^{-1})$ filter and applying the combined signal to the precursor equalizer, where $Z^{-1}$ is a delay operator of one baud.

* * * * *